US012598476B2

(12) United States Patent
Si

(10) Patent No.: US 12,598,476 B2
(45) Date of Patent: Apr. 7, 2026

(54) METHOD AND APPARATUS FOR OPERATION MODE ON UNLICENSED SPECTRUM

(71) Applicant: Samsung Electronics Co., Ltd., Suwon-si (KR)

(72) Inventor: Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 367 days.

(21) Appl. No.: 17/305,159

(22) Filed: Jun. 30, 2021

(65) Prior Publication Data

US 2022/0022048 A1 Jan. 20, 2022

Related U.S. Application Data

(60) Provisional application No. 63/196,859, filed on Jun. 4, 2021, provisional application No. 63/144,763, filed on Feb. 2, 2021, provisional application No. 63/136,867, filed on Jan. 13, 2021, provisional application No. 63/092,831, filed on Oct. 16, 2020, (Continued)

(51) Int. Cl.
*H04W 16/14* (2009.01)
*H04W 74/0808* (2024.01)

(52) U.S. Cl.
CPC ....... *H04W 16/14* (2013.01); *H04W 74/0808* (2013.01)

(58) Field of Classification Search
CPC .......................... H04W 16/14; H04W 74/0808
See application file for complete search history.

(56) References Cited

U.S. PATENT DOCUMENTS

| 11,723,047 B2 * | 8/2023 | Si | H04W 72/30 |
| | | | 370/329 |
| 2017/0094709 A1 * | 3/2017 | Wang | H04W 72/56 |
| 2019/0268939 A1 | 8/2019 | Yang et al. | |

(Continued)

FOREIGN PATENT DOCUMENTS

| EP | 3413494 A1 | 12/2018 |
| KR | 10-2020-0026715 A | 3/2020 |
| KR | 10-2020-0080864 A | 7/2020 |

OTHER PUBLICATIONS

Spreadtrum Communications, "Discussion on DL signals and channels for NR-U", 3GPP TSG RAN WG1 #98b R1-1910026, Oct. 14, 2019-Oct. 20, 2019 (Year: 2019).*

(Continued)

*Primary Examiner* — Justin T Van Roie

(57) ABSTRACT

Methods and apparatuses for operation modes on unlicensed spectrum in a wireless communication system including a carrier operating with shared spectrum channel access. A method of operating a UE includes receiving a set of higher layer parameters from a BS over the carrier and determining, from the set of higher layer parameters, a first operation mode for the BS. The method further includes determining, from the set of higher layer parameters, a second operation mode for the UE and transmitting to the BS based on the second operation mode. The first operation mode and the second operation mode include information on whether channel sensing is required before transmission on the carrier operating with shared spectrum channel access.

12 Claims, 15 Drawing Sheets

Related U.S. Application Data provisional application No. 63/052,326, filed on Jul. 15, 2020.

(56)                    References Cited

U.S. PATENT DOCUMENTS

| | | | | |
|---|---|---|---|---|
| 2020/0045709 | A1* | 2/2020 | Seo | H04W 72/53 |
| 2020/0187251 | A1 | 6/2020 | Noh et al. | |
| 2021/0051485 | A1* | 2/2021 | Lin | H04W 72/0446 |
| 2021/0100030 | A1* | 4/2021 | Myung | H04W 74/0833 |
| 2021/0212100 | A1* | 7/2021 | Xiong | H04W 72/535 |
| 2021/0235500 | A1 | 7/2021 | Hong | |
| 2022/0200773 | A1* | 6/2022 | Alriksson | H04L 5/005 |
| 2022/0287093 | A1* | 9/2022 | Iyer | H04B 7/0695 |
| 2023/0254893 | A1* | 8/2023 | Shibaike | H04W 72/0453 |
| | | | | 370/329 |

OTHER PUBLICATIONS

ZTE, Sanechips, "Discussion on channel access procedure for NR-U", 3GPP TSG RAN WG1 Meeting #98Bis R1-1909974, Oct. 14, 2019-Oct. 20, 2019 (Year: 2019).*

International Search Report and Written Opinion of the International Searching Authority dated Oct. 27, 2021, in connection with International Application No. PCT/KR2021/009110, 7 pages.

NTT DOCOMO, Inc., "Channel Access Mechanism for NR in 60 GHz unlicensed spectrum," R1-2004418, 3GPP TSG RAN WG1 #101, e-Meeting, May 25-Jun. 5, 2020, 4 pages.

"3rd Generation Partnership Project; Technical Specification Group Radio Access Network; NR; Physical channels and modulation (Release 16)", 3GPP TS 38.211 V16.1.0, Mar. 2020, 130 pages.

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)" 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

Extended European Search Report issued Dec. 21, 2023 regarding Application No. 21842767.2, 12 pages.

Spreadtrum Communications, "Discussion on required changes to NR using existing NR waveform", 3GPP TSG RAN WG1 #101, R1-2004004, May 2020, 5 pages.

Nokia et al., "Discussion on RLM requirements in NR-U", 3GPP TSG-RAN WG4 Meeting #95-e, R4-2007264, May 2020, 8 pages.

* cited by examiner

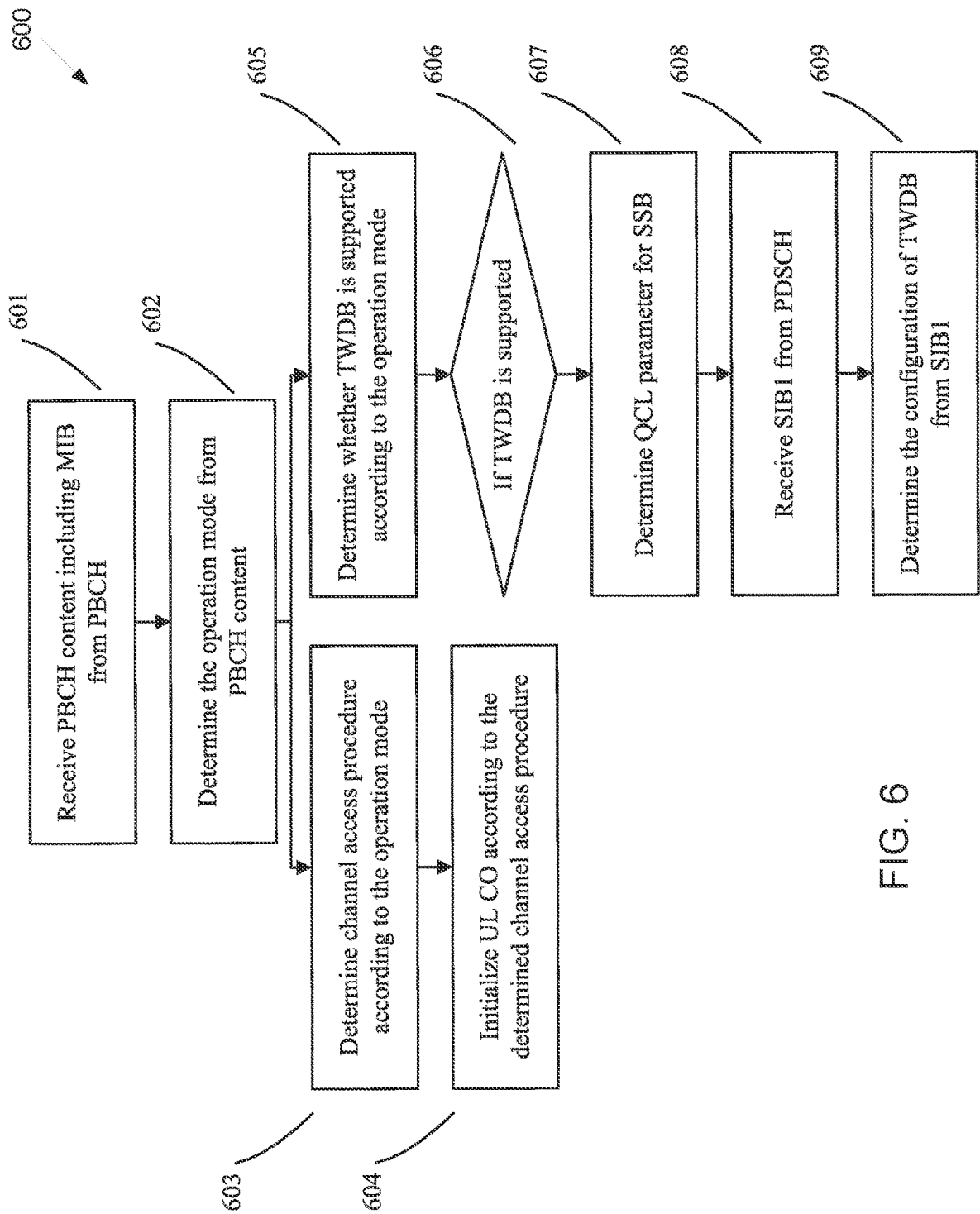

600

601  Receive PBCH content including MIB from PBCH

602  Determine the operation mode from PBCH content

603  Determine channel access procedure according to the operation mode

604  Initialize UL CO according to the determined channel access procedure

605  Determine whether TWDB is supported according to the operation mode

606  If TWDB is supported

607

608  Determine QCL parameter for SSB

609  Receive SIB1 from PDSCH

Determine the configuration of TWDB from SIB1

FIG. 6

METHOD AND APPARATUS FOR OPERATION MODE ON UNLICENSED SPECTRUM

CROSS-REFERENCE TO RELATED APPLICATIONS AND CLAIM OF PRIORITY

The present application claims priority to: U.S. Provisional Patent Application No. 63/052,326, filed on Jul. 15, 2020; U.S. Provisional Patent Application No. 63/092,831, filed on Oct. 16, 2020; U.S. Provisional Patent Application No. 63/136,867, filed on Jan. 13, 2021; U.S. Provisional Patent Application No. 63/144,763, filed on Feb. 2, 2021; and U.S. Provisional Patent Application No. 63/196,859, filed on Jun. 4, 2021. The content of the above-identified patent document is incorporated herein by reference.

TECHNICAL FIELD

The present disclosure relates generally to wireless communication systems and, more specifically, the present disclosure relates to operation modes on unlicensed spectrum.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to operation modes on unlicensed spectrum.

In one embodiment, a base station (BS) in a wireless communication system including a carrier operating with shared spectrum channel access is provided. The BS includes a processor configured to determine a first operation mode for the BS and a second operation mode for a user equipment (UE) served by the BS and indicate the first operation mode and the second operation mode in a set of higher layer parameters. The first operation mode and the second operation mode include information on whether channel sensing is required before transmission on the carrier operating with shared spectrum channel access. The BS also includes a transceiver operably connected to the transceiver. The transceiver is configured to transmit to the UE over the carrier based on the first operation mode and receive from the UE over the carrier based on the second operation mode.

In another embodiment, a UE in a wireless communication system including a carrier operating with shared spectrum channel access is provided. The UE includes a transceiver configured to receive a set of higher layer parameters from a BS over the carrier and a processor operably connected to the transceiver. The processor is configured to determine, from the set of higher layer parameters, a first operation mode for the BS and determine, from the set of higher layer parameters, a second operation mode for the UE. The first operation mode and the second operation mode include information on whether channel sensing is required before transmission on the carrier operating with shared spectrum channel access. The transceiver is further configured to transmit to the BS based on the second operation mode.

In yet another embodiment, a method of operating a UE in a wireless communication system including a carrier operating with shared spectrum channel access is provided. The method includes receiving a set of higher layer parameters from a BS over the carrier and determining, from the set of higher layer parameters, a first operation mode for the BS. The method further includes determining, from the set of higher layer parameters, a second operation mode for the UE and transmitting to the BS based on the second operation mode. The first operation mode and the second operation mode include information on whether channel sensing is required before transmission on the carrier operating with shared spectrum channel access.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates a flowchart of a method for an operation mode of UE according to embodiments of the present disclosure;

DETAILED DESCRIPTION

FIG. 1 through FIG. 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR; Physical channels and modulation"; 3GPP TS 38.212 v16.1.0, "NR; Multiplexing and Channel coding"; 3GPP TS 38.213 v16.1.0, "NR; Physical Layer Procedures for Control"; 3GPP TS 38.214 v16.1.0, "NR; Physical Layer Procedures for Data"; and 3GPP TS 38.331 v16.1.0, "NR; Radio Resource Control (RRC) Protocol Specification."

Figure 1:
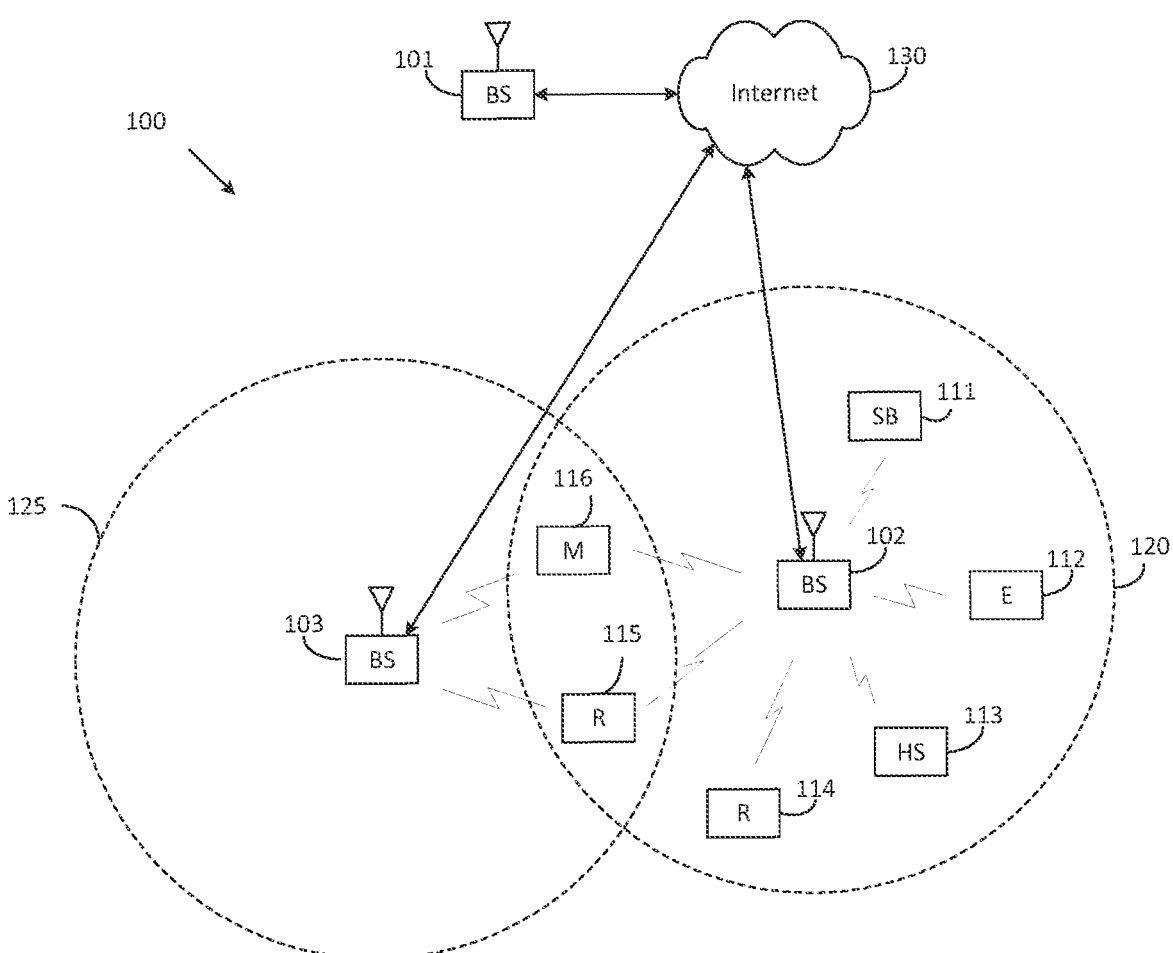
FIG. 1 illustrates an example wireless network according to embodiments of the present disclosure.
Figure 2:
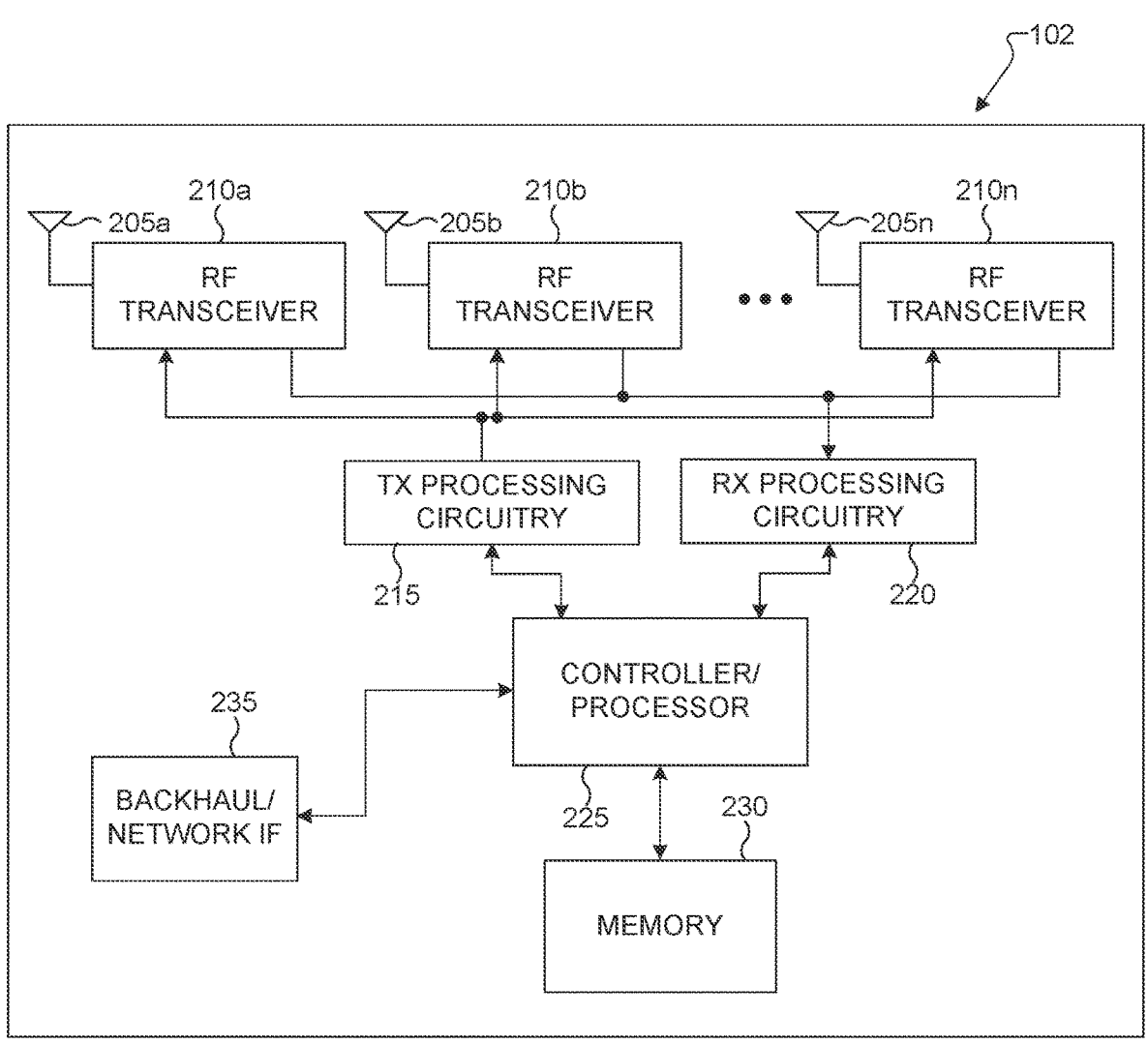
FIG. 2 illustrates an example gNB according to embodiments of the present disclosure.
Figure 3:
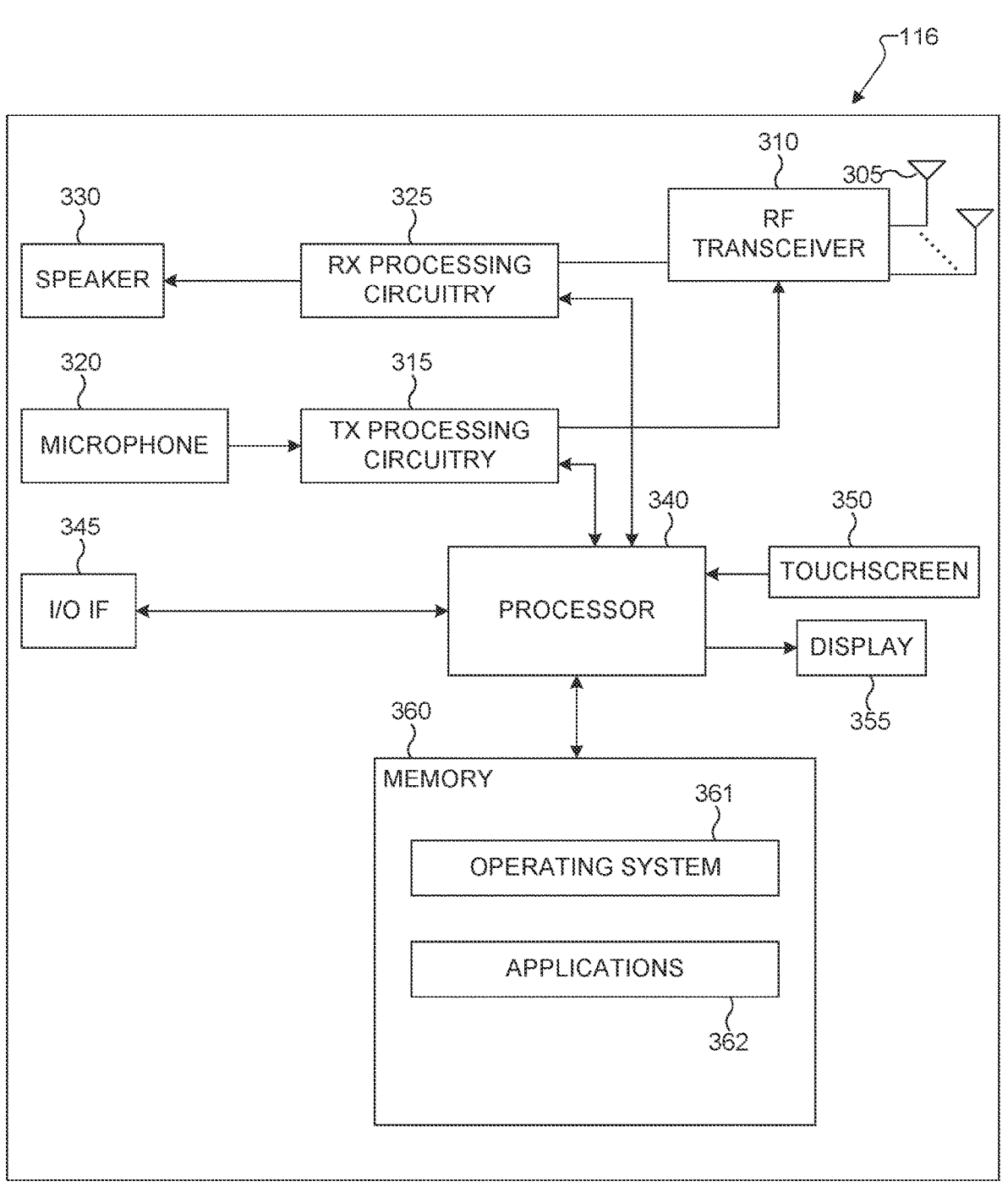
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, LTE, LTE-A, high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for operation modes on unlicensed spectrum. In certain embodiments, and one or more of the gNBs 101-103 includes circuitry, programing, or a combination thereof, for operation modes on unlicensed spectrum.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) process- ing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed base- band signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmis- sion of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for operation modes on unlicensed spectrum. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR commu- nication systems have been developed and are currently being deployed. The 5G/NR communication system is con- sidered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive mul- tiple-input multiple-output (MIMO), full dimensional MIMO (FD-MIMO), array antenna, an analog beam form- ing, large scale antenna techniques are discussed in 5G/NR communication systems.

In addition, in 5G/NR communication systems, develop- ment for system network improvement is under way based on advanced small cells, cloud radio access networks (RANs), ultra-dense networks, device-to-device (D2D) communication, wireless backhaul, moving network, coop- erative communication, coordinated multi-points (CoMP), reception-end interference cancellation and the like.

The discussion of 5G systems and frequency bands asso- ciated therewith is for reference as certain embodiments of the present disclosure may be implemented in 5G systems. However, the present disclosure is not limited to 5G systems or the frequency bands associated therewith, and embodi- ments of the present disclosure may be utilized in connec- tion with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub- carriers (SCs). For example, a slot can have duration of 0.5 milliseconds or 1 millisecond, include 14 symbols and an RB can include 12 SCs with inter-SC spacing of 30 KHz or 15 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figures 4, 5:
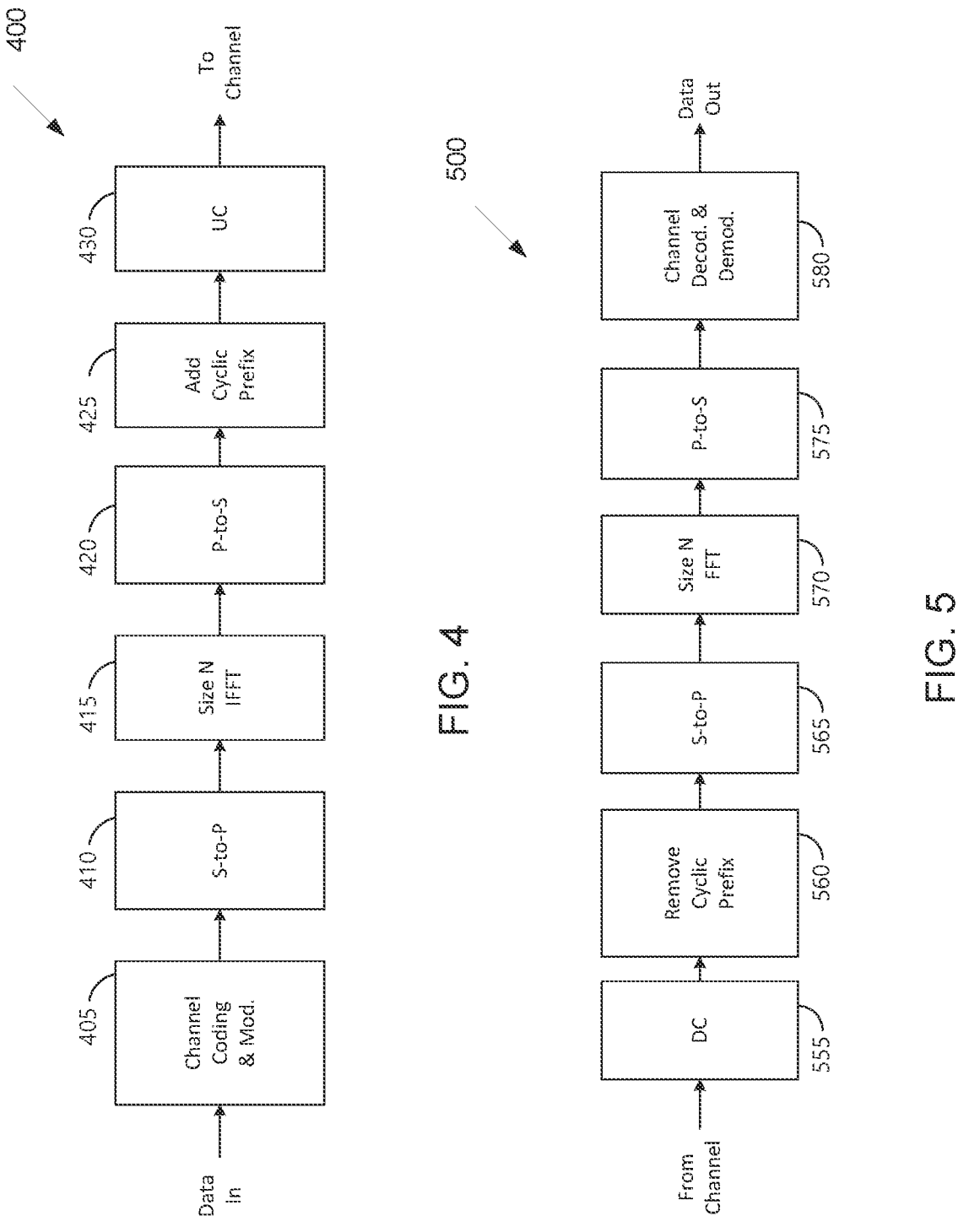
FIGS. 4 and 5 illustrate example wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the beam indication channel in a multi-beam system as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

The present disclosure focuses on the design of operation mode for unlicensed spectrum, wherein one operation mode can include components at least one from channel access feature, synchronization signal/physical broadcast channel (SS/PBCH) block (SSB) related feature, numerology related feature, or channel related feature. The present disclosure provides components for operation modes; association among components in one operation mode; example of operation modes; and UE's acquisition of the operation mode. Specifically, the present disclosure provides: an explicit indication of the operation mode; an explicit indication of the components in the operation mode; and an implicit indication of the operation mode.

In NR Rel-15, multiple numerologies are supported, for SS/PBCH block and other transmission separately. A summary of the supported numerologies is given by TABLE 1.

TABLE 1

| Supported numerology for NR Rel-15 | | | |
|---|---|---|---|
| Subcarrier spacing | Cyclic prefix | Supported for SS/PBCH block | Supported for other transmission |
| 15 kHz | Normal | Yes | Yes |
| 30 kHz | Normal | Yes | Yes |
| 60 kHz | Normal, Extended | No | Yes |
| 120 kHz | Normal | Yes | Yes |
| 240 kHz | Normal | Yes | No |

In NR Rel-16, an operation on unlicensed spectrum was supported in frequency range 1 (FR1), wherein a gNB or a UE initializes a channel occupancy by performing a channel access procedure based on channel sensing. Within a channel occupancy, the transmission direction can be switched from downlink to uplink or uplink to downlink as long as certain condition is satisfied, wherein another channel access procedure may be required in the gap when the transmission direction switches.

For a new carrier frequency range between 52.6 GHz and 71 GHz, the system parameter, RRC parameter, and channel access procedure can be redesigned, and there can be association among the system parameter, RRC parameter, and channel access procedure.

Although exemplary descriptions and embodiments to follow assume OFDM or OFDMA, this disclosure can be extended to other OFDM-based transmission waveforms or multiple access schemes such as filtered OFDM (F-OFDM).

In one embodiment, one operation mode can include at least one of the following components.

In one example of first component, one operation mode can include a type of channel access procedure. In one example of this component, the type of channel access procedure can be channel sensing based channel access to initialize a channel occupancy (e.g., listen before talk (LBT)-based channel access procedure), and if the channel is sensed as idle, the gNB or UE can proceed with transmission on the channel; while if the channel is sensed as busy, the gNB or UE may not transmit on the channel. In another example of this component, the type of channel access procedure can be immediate transmission without sensing the channel (e.g., no-LBT-based channel access procedure). In one aspect of this example, this type of channel access procedure (e.g., no-LBT-based channel access procedure) is applicable for the regions where LBT-based channel access procedure is not mandated, if the absence of any other technology sharing the channel can be guaranteed on a long term basis (e.g., by level of regulation).

In another example of second component, one operation mode can include at least one associated numerology, wherein the numerology includes at least a subcarrier spacing and a cyclic prefix length. In one example, the set of at least one numerology included in one operation mode could be distinct from the set of at least one numerology included in another operation mode. In another example, the set of at least one numerology include in an operation mode can share common element with each other.

In yet another example of third component, one operation mode can include a maximum carrier bandwidth. In one example, a maximum FFT size corresponding to the maximum carrier bandwidth according to one subcarrier spacing included in one operation mode can be the same for all the operation modes. In one aspect, if the maximum carrier bandwidth for operation modes are different, the maximum carrier bandwidth for carrier aggregation (CA) can be different in the operation modes.

In yet another example of fourth component, one operation mode can include a number of configured BWPs. In one example, for the operation mode including a larger maximum carrier bandwidth, the number of configured BWPs for the operation mode can be smaller.

The mentioned examples/embodiments in the present disclosure can be further included in the BWP configuration included in an operation mode.

In yet another example of fifth component, one operation mode can include a configurable transmission window for discovery burst, wherein the discovery burst includes at least SS/PBCH block and can further include configurable PDCCH/PDSCH of RMSI, and/or CSI-RS. In one example, one operation mode can include the supporting of a transmission window for discovery burst, and one SS/PBCH block may have multiple transmission occasions within the transmission window according to a QCL parameter, wherein the SS/PBCH blocks on the multiple transmission occasions are assumed to be QCLed. In another example, another operation mode can include not supporting a transmission window for discovery burst, and not supporting of the QCL parameter for SS/PBCH block transmission.

In yet another example of sixth component, one operation mode can include a SS/PBCH block pattern in time domain. Denoting the SS/PBCH block pattern in time domain as $$S_{start} + N_{symb}^{slot} \cdot N_{slot}^{unit} \cdot n,$$

where $S_{start}$ is the set of starting symbols of SS/PBCH block within a predefined time unit, $$N_{slot}^{unit}$$

is the length of the predefined time unit in term of slot, $$N_{symb}^{slot}$$

is the number of symbols in a slot, and n is the index of the predefined time unit. In one example, the value of n can be different for different operation mode.

In yet another example of seven component, one operation mode can include a set of synchronization rasters. In one example, global synchronization channel number (GSCN) values corresponding to the synchronization raster of one operation mode do not overlap with the GSCN values corresponding to the synchronization raster of another operation mode.

In yet another example of eighth component, one operation mode can include channelization of the carrier. In one example, absolute radio frequency channel number (ARFCN) values corresponding to the channel raster of one operation mode do not overlap with the ARFCN values corresponding to the channel raster of another operation mode.

In yet another example of ninth component, one operation mode can include a band number for the carrier operated on the band.

In yet another example of tenth component, one operation mode can include an SRS starting position in a slot. In one example, one operation mode can include the starting position can be any OFDM symbol in a slot. In another example, another operation mode can include the starting position can be restricted to a subset of symbols in a slot.

In yet another example of eleventh component, one operation mode can include whether to support type3-HARQ codebook. In one example, one operation mode can include supporting of the type3-HARQ codebook. In another example, another operation mode can include not supporting the type3-HARQ codebook.

In yet another example of twelfth component, one operation mode can include whether to support multi-PUSCH UL grant. In one example, one operation mode can include supporting of the multi-PUSCH UL grant. In another example, another operation mode can include not supporting the multi-PUSCH UL grant.

In yet another example of thirteenth component, one operation mode can include whether to support search space switching. In one example, one operation mode can include supporting of the search space switching. In another example, another operation mode can include not supporting the search space switching.

In one embodiment, there can be association among components in an operation mode. In one example, if the value of one component in an operation mode is provided, the value of another component in an operation mode is known to the UE. In one instance of this example, the UE does not expect to be configured with two components without the association relationship. In another instance of this example, if the UE is configured with a second component whose value is not associated with the configured value of the first component, the UE can ignore the configuration of the second component.

In one example, if a UE determines the channel access procedure is associated with a channel sensing procedure, the UE expects to be configured with a transmission window for discovery burst (TWDB) and/or a QCL parameter for SS/PBCH block.

In another example, if a UE determines the channel access procedure is not associated with a channel sensing procedure, the UE expects not to be configured with a TWDB and/or a QCL parameter for SS/PBCH block.

In yet another example, if a UE determines to be configured with a TWDB, the UE expects the channel access procedure is associated with a channel sensing procedure.

In yet another example, if a UE determines not to be configured with a TWDB, the UE expects the channel access procedure is not associated with a channel sensing procedure.

In yet another example, if a UE determines the channel access procedure is associated with a channel sensing procedure, the UE expects a first set of numerologies (e.g., 960 kHz) to be supported for the channel.

In yet another example, if a UE determines the channel access procedure is not associated with a channel sensing procedure, the UE expects a second set of numerologies (e.g., 120 kHz) to be supported for the channel.

In yet another example, if a UE determines a first set of numerologies (e.g., 960 kHz) to be supported for the channel, the UE expects the channel access procedure is associated with a channel sensing procedure.

In yet another example, if a UE determines a second set of numerologies (e.g., 120 kHz) to be supported for the channel, the UE expects the channel access procedure is not associated with a channel sensing procedure.

One set of example operation modes according to the present disclosure is shown in TABLE 2.

TABLE 2

| Example operation modes. | |
| --- | --- |
| Operation Mode 1 | Operation Mode 2 |
| Channel access procedure | Channel access procedure |
| Sensing is required before initializing a channel occupancy | Sensing is not required before initializing a channel occupancy |
| BWP configuration | BWP configuration |
| Larger maximum configurable BWP bandwidth (e.g., 2.16 GHz) | Smaller maximum configurable BWP bandwidth (e.g., 400 MHz) |
| Larger maximum configurable SCS (e.g., 960 kHz) | Smaller maximum configurable SCS (e.g., 120 kHz) |
| SS/PBCH block related components | SS/PBCH block related components |
| Support transmission window for discovery burst | Do not support transmission window for discovery burst |
| Support QCL parameter for SS/PBCH block | Do not support QCL parameter for SS/PBCH block |
| Larger number of candidate SS/PBCH blocks in half frame (e.g., larger than 64) | Smaller number of candidate SS/PBCH blocks in half frame (e.g., equal to 64) |
| First set of numerologies for SS/PBCH block (e.g., 960 kHz) | Second set of numerologies for SS/PBCH block (e.g., 120 kHz) |
| First set of synchronization raster for SS/PBCH block (e.g., single GSCN per 2.16 GHz) | Second set of synchronization raster for SS/PBCH block (e.g., multiple GSCNs per 2.16 GHz) |
| Channel related components | Channel related components |
| Larger maximum carrier bandwidth (e.g., 2.16 GHz) | Smaller maximum carrier bandwidth (e.g., 400 MHz) |
| Larger SCS (960 kHz) | Smaller SCS (120 kHz) |
| First set of channel raster (e.g., single ARFCN for 2.16 GHz) | Second set of channel raster |

Another set of example operation modes according to this disclosure is shown in TABLE 3.

TABLE 3

Example operation modes.

| Operation Mode 1 | Operation Mode 2 |
|---|---|
| Channel access procedure | Channel access procedure |
| Sensing is required before | Sensing is not required before |
| initializing a channel occupancy | initializing a channel occupancy |
| SS/PBCH block related components | SS/PBCH block related components |
| Support transmission window for | Do not support transmission |
| discovery burst | window for discovery burst |
| Support QCL parameter for | Do not support QCL parameter for |
| SS/PBCH block | SS/PBCH block |
| Larger number of candidate | Smaller number of candidate |
| SS/PBCH blocks in half frame (e.g., | SS/PBCH blocks in half frame (e.g., |
| larger than 64) | equal to 64) |

Yet another set of example operation modes according to this disclosure is shown in TABLE 4.

TABLE 4

Example operation modes.

| Operation Mode 1 | Operation Mode 2 |
|---|---|
| Channel access procedure | Channel access procedure |
| Sensing is required before | Sensing is not required before |
| initializing a channel occupancy | initializing a channel occupancy |

Yet another set of example operation modes according to this disclosure is shown in TABLE 5.

TABLE 5

Example operation modes.

| Operation Mode 1 | Operation Mode 2 |
|---|---|
| Channel access procedure | Channel access procedure |
| Sensing is required before | Sensing is not required before |
| initializing a channel occupancy | initializing a channel occupancy |
| SS/PBCH block related components | SS/PBCH block related components |
| Support transmission window for | Do not support transmission |
| discovery burst | window for discovery burst |
| Support QCL parameter for | Do not support QCL parameter for |
| SS/PBCH block | SS/PBCH block |
| Larger number of candidate | Smaller number of candidate |
| SS/PBCH blocks in half frame (e.g., | SS/PBCH blocks in half frame (e.g., |
| larger than 64) | equal to 64) |
| Other components | Other components |
| Support type3-HARQ codebook | Do not support type3-HARQ |
| Support multi-PUSCH UL grant | codebook |
| | Do not support multi-PUSCH UL |
| | grant |

In one embodiment, an explicit indication of an operation mode is provided.

In one example, the UE is configured by the gNB explicitly with an operation mode, and the UE acquires the components of the operation mode using the fixed association of the components with the explicitly configured operation mode. For this example, when provided an operation mode, the UE can determine the components of the operation mode according to the example operation mode provided in this disclosure, as shown in TABLE 2, TABLE 3, TABLE 4, or TABLE 5.

In one example, the UE is configured by the gNB explicitly with an operation mode using PBCH content (e.g., MIB). For one instance of this example, 1 bit in the PBCH content (e.g., MIB) explicitly indicates the operation mode. For another instance of this example, the operation mode including a channel sensing procedure not required to initialize a channel occupancy is jointly coded with the QCL parameter for SS/PBCH block, such as {"channel sensing not required," "channel sensing required and $$N_{SSB}^{QCL} = N_1,"$$

"channel sensing required and $$N_{SSB}^{QCL} = N_2,"$$

"channel sensing required and $$N_{SSB}^{QCL} = N_3"\},$$

wherein $N_1$, $N_2$, and $N_3$ are integers, e.g., $N_1=64$, $N_2=32$, $N_3=16$.

FIG. 6 illustrates a flowchart of a method 600 for an operation mode of UE according to embodiments of the present disclosure. The method 600 as may be performed by a UE (e.g., 111-116 as illustrated in FIG. 1. An embodiment of the method 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

As illustrated in FIG. 6, a UE first receives the PBCH content from PBCH wherein the PBCH content includes a MIB (step 601) and determines the operation mode from the PBCH content (e.g., included in the MIB) according to the examples in this disclosure (step 602). Based on the determined operation mode, the UE further determines whether the channel access procedure required a channel sensing procedure (step 603), and whether a TWDB is supported (step 605). The UE can initialize an uplink channel occupancy according to the determined channel access procedure (step 604). If the TWDB is determined to be supported (step 606), the UE further determines a QCL parameter for SS/PBCH block $$\left(\text{i.e., } N_{SSB}^{QCL}\right)$$

(step 607) and receives SIB1 from PDSCH (step 608) and determines the configuration of TWDB from SIB1 (step 609).

In another example, the UE is configured by the gNB explicitly with an operation mode using system information (e.g., SIB1). For one instance of this example, 1 bit in system information (e.g., SIB1) explicitly indicates the operation mode. For another instance of this example, the indication of operation mode can be jointly coded with other information included in the system information (e.g., SIB1).

Figure 7:
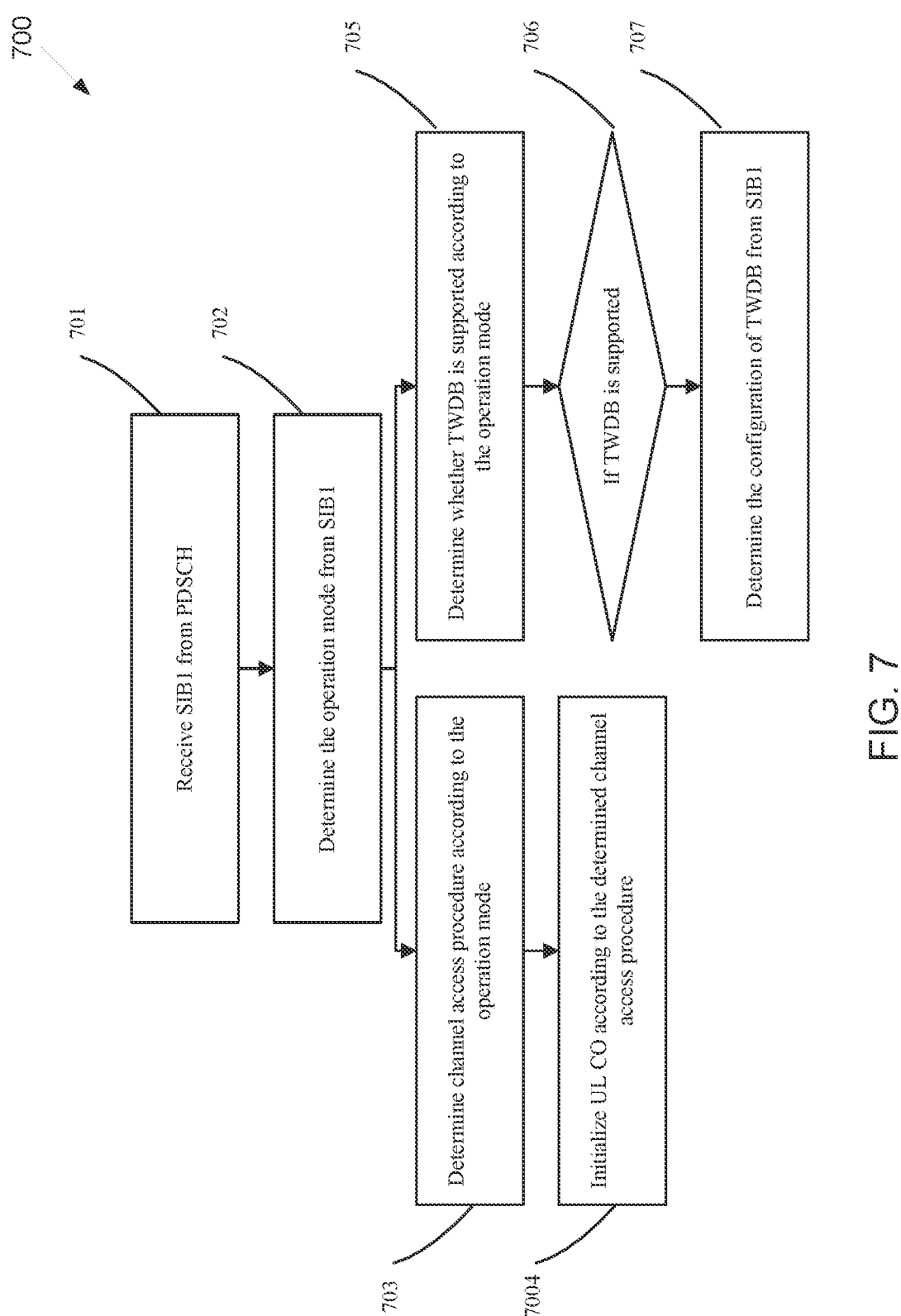
FIG. 7 illustrates another flowchart of a method for an operation mode of UE according to embodiments of the present disclosure.

FIG. 7 illustrates another flowchart of a method 700 for an operation mode of UE according to embodiments of the present disclosure. The method 700 as may be performed by a UE (e.g., 111-116 as illustrated in FIG. 1. An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

As illustrated in FIG. 7, a UE first receives the system information (e.g., SIB1) from PDSCH (step 701), and determines the operation mode from a field explicitly included in the system information (e.g., SIB1) (step 702). Based on the determined operation mode, in one instance, the UE further determines whether the channel access procedure requires channel sensing (step 703), and in another instance, the UE can further determine whether a TWDB is supported (step 705). The UE can initialize an uplink channel occupancy according to the determined channel access procedure (step 704). If the TWDB is determined to be supported (step 706), the UE further determines the configuration of TWDB from system information (e.g., SIB1) (step 707).

In one instance of this example, the indication using RRC parameters can be applicable to UE in RRC_IDLE or RRC_INACTIVE state.

In yet another example, the UE is configured by the gNB explicitly with an operation mode using higher layer parameters (e.g., RRC parameters). In one instance of this example, 1 bit in the higher layer parameter explicitly indicates the operation mode. In another instance of this example, the indication of operation mode can be jointly coded with other information included in the higher layer parameters (e.g., RRC parameters).

Figure 8:
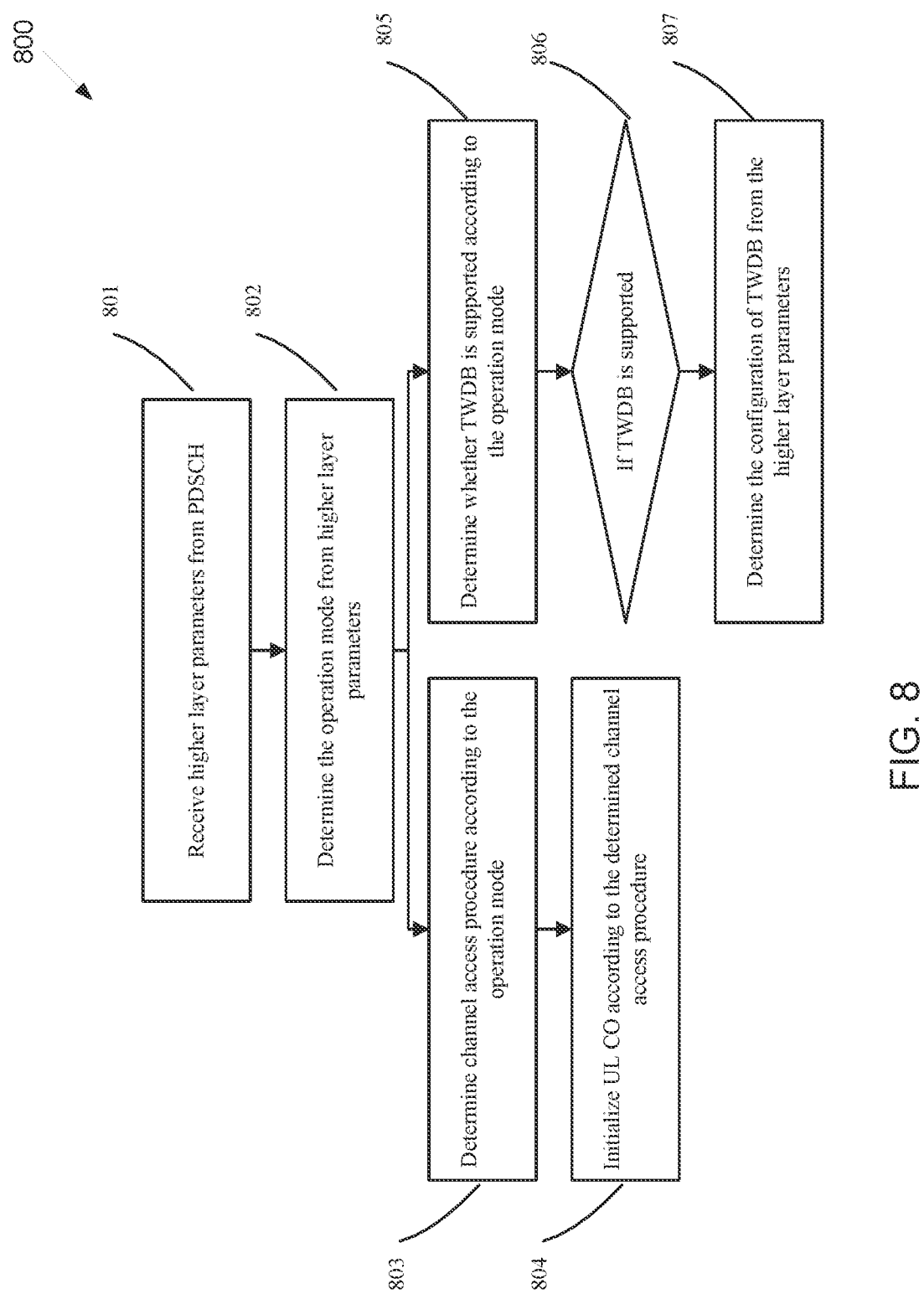
FIG. 8 illustrates yet another a flowchart of a method for an operation mode of UE according to embodiments of the present disclosure.

FIG. 8 illustrates yet another a flowchart of a method 800 for an operation mode of UE according to embodiments of the present disclosure. The method 800 as may be performed by a UE (e.g., 111-116 as illustrated in FIG. 1. An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

As illustrated in FIG. 8, a UE first receives the higher layer parameters from PDSCH (step 801) and determines the operation mode from a field explicitly included in the higher layer parameters (step 802). Based on the determined operation mode, in one instance, the UE further determines the channel access procedure (step 803), and in another instance, the UE can further determine whether a TWDB is supported (step 805). The UE can initialize an uplink channel occupancy according to the determined channel access procedure (step 804). If the TWDB is determined to be supported (step 806), the UE further determines the configuration of TWDB from the higher layer parameters (step 807).

In a first sub-example, the indication is cell-specific in a cell-specific RRC parameter.

In a second sub-example, the indication is cell-specific in a UE-specific RRC parameter.

In a third sub-example, the indication is UE-specific in a UE-specific RRC parameter.

In a fourth sub-example, the indication is cell-specific in a UE-group-specific RRC parameter. For instance, the UEs are intended to be covered by the same beam (e.g., in a beam-specific manner), e.g., the group of UE can be with the TCI state.

In a fifth sub-example, the indication is UE-specific in a UE-group-specific RRC parameter. For instance, the UEs are intended to be covered by the same beam (e.g., in a beam-specific manner), e.g., the group of UE can be with the TCI state.

In one instance of this example, the indication using RRC parameters can be applicable to UE in RRC_CONNECTED state.

In yet another example, the UE is configured by the gNB explicitly with an operation mode using a DCI format, and the UE initializes the UL transmissions according to the indicated operation mode in the DCI format. In one instance for this example, 1 bit in the DCI format indicates the operation mode. In another instance for this example, the indication of operation mode is jointly coded with other information in the DCI format.

In one sub-example, the DCI format can be the ones for scheduling PUSCH (e.g., Format 0_0, or 0_1, or 0_2), then the scheduled PUSCH transmission by the DCI format may follow the indicated operation mode.

In another sub-example, the DCI format can be associated with a group-common PDCCH (e.g., Format 2_0), then all UL transmissions within the channel occupancy time (COT) indicated by the group-common PDCCH may follow the indicated operation mode.

In yet another sub-example, the DCI format can be the ones for scheduling PDSCH (e.g., Format 1_0, or 1_1, or 1_2), then the PUSCH transmission corresponding to the PDSCH transmission scheduled by the DCI format may follow the indicated operation mode. For instance, PUSCH transmission in msg3 corresponding to PDSCH transmission in msg2 scheduled by the DCI format 1_0 may follow the indicated operation mode in the DCI format 1_0.

In a first embodiment, the operation mode can be common for all the nodes in the cell, and a gNB and all the gNB's serving UEs share the same operation mode.

In one example for this embodiment, if there is an indication of operation mode in system information (e.g., MIB or SIB1) as described in the present disclosure, the indicated operation mode is common for both a gNB and the gNB's serving UEs. When a UE receives the system information (e.g., MIB or SIB1), the UE determines the gNB's operation mode, and the UE's own operation mode, and the two operation modes are the same.

In another example for this embodiment, if there is an indication of operation mode as cell-specific in RRC parameter as described in the present disclosure, the indicated operation mode is common for both a gNB and the gNB's serving UEs. When a UE received the cell-specific indication in the RRC parameter, the UE determines the gNB's operation mode and the UE's own operation mode, and the two operation modes are the same.

In yet another example for this embodiment, if there is an indication of operation mode as UE-specific or UE-group-specific in a RRC parameter as described in the present disclosure, the indicated operation mode is common for both gNB and the UE. When a UE received the RRC parameter, the UE determines the gNB's operation mode and the UE's own operation mode, and the two operation modes are the same.

In a second embodiment, the operation mode can be same or different for nodes in the cell, and a gNB can have one or more operation mode, and each UE can have a separate operation mode, wherein the UEs in a cell can have same or different operation mode. In one further variant of this embodiment, a group of UEs can share the same operation mode, and different groups of UEs can have same or different operation mode.

In one example for this embodiment, if there is an indication of operation mode in system information (e.g., MIB or SIB1) as described in the disclosure, the indication can have two components (e.g., a pair of operation modes): one first operation mode for the gNB, and a second operation mode for the UEs served by the gNB. When a UE receives the system information, the UE can determine the gNB's operation mode, and the UE's own operation mode, based on the two components in the indication respectively.

In another example for this embodiment, if there is an indication of operation mode in system information (e.g., MIB or SIB1) as described in the disclosure, the indication includes the operation mode for the UE. When a UE receives the system information, the UE can determine the UE's own operation mode.

In another example for this embodiment, if there is an indication of operation mode in system information (e.g., MIB or SIB1) as described in the disclosure, the indication includes the operation mode for the gNB. When a UE receives the system information, the UE can determine gNB's operation mode.

In yet another example of this embodiment, if there is an indication of operation mode in system information (e.g., MIB or SIB1) as described in the disclosure, the indication has multiple components wherein each of the component corresponds to the gNB and a group of UEs (e.g., each of the component corresponds to the operation of gNB and UEs corresponding to a beam), and each component can have a pair of operation modes: one operation mode for the gNB, and the other operation mode for the UE(s) within the corresponding component. When a UE receives the system information, the UE determines the applicable component first (e.g., which beam is applicable to the UE), and then further determines the gNB's operation mode and the gNB's own operation mode, according to the determined component. For one instance, the indication can be expressed in two bitmaps, wherein one of the bitmaps corresponds to gNB's operation modes per component (e.g., per beam), and the other of the bitmap corresponds to a group of UE's operation mode per component (e.g., per beam).

In yet another example of this embodiment, if there is an indication of operation mode in system information (e.g., MIB or SIB1) as described in the disclosure, the indication has one component corresponding to the operation mode of the gNB and another set of multiple components wherein each of the component corresponds to a group of UEs (e.g., each of the component corresponds to the operation of UEs corresponding to a beam). When a UE receives the system information, the UE determines the gNB's operation mode, and then determines the applicable component in the set of multiple components (e.g., which beam is applicable to the UE), and then further determines the UE's operation mode, according to the determined component. For one instance, the indication of the set of multiple components can be expressed in a bitmap.

In yet another example for this embodiment, if there is an indication of operation mode as cell-specific in RRC parameter as described in the present disclosure, the indication can have two components (e.g., an operation mode pair): one first operation mode for the gNB, and a second operation mode for the UEs served by the gNB. When a UE receives the RRC parameter, the UE can determine the gNB's operation mode, and the UE's own operation mode, based on the two components in the indication respectively.

In yet another example for this embodiment, if there is an indication of operation mode as cell-specific in RRC parameter as described in the present disclosure, the indication includes the operation mode for the UE. When a UE receives the RRC parameter, the UE can determine the UE's own operation mode.

In yet another example for this embodiment, if there is an indication of operation mode as cell-specific in RRC parameter as described in the present disclosure, the indication includes the operation mode for the gNB. When a UE receives the RRC parameter, the UE can determine a gNB's operation mode.

In yet another example of this embodiment, if there is an indication of operation mode as cell-specific in RRC parameter as described in the disclosure, the indication has multiple components wherein each of the component corresponds to the gNB and a group of UEs (e.g., each of the component corresponds to the operation of gNB and UEs corresponding to a beam), and each component can have a pair of operation modes: one operation mode for a gNB, and the other operation mode for UE(s) within the corresponding component. When a UE receives the RRC parameter, the UE determines the applicable component first (e.g., which beam is applicable to the UE), and then further determines the gNB's operation mode and the UE's own operation mode, according to the determined component. For one instance, the indication can be expressed in two bitmaps, wherein one of the bitmaps corresponds to a gNB's operation modes per component (e.g., per beam), and the other of the bitmaps corresponds to a group of UE's operation mode per component (e.g., per beam).

In yet another example of this embodiment, if there is an indication of operation mode as cell-specific in RRC parameter as described in the disclosure, the indication has one component corresponding to the operation mode of the gNB and another set of multiple components wherein each of the component corresponds to a group of UEs (e.g., each of the component corresponds to the operation of UEs corresponding to a beam). When a UE receives RRC parameter, the UE determines the gNB's operation mode, and then determines the applicable component in the set of multiple components (e.g., which beam is applicable to the UE), and then further determines the UE's operation mode, according to the determined component. For one instance, the indication of the set of multiple components can be expressed in a bitmap.

In yet another example for this embodiment, if there is an indication of operation mode as UE-specific in RRC parameter or UE-group-specific as described in the present disclosure, the indication can have two components (e.g., an operation mode pair): one first operation mode for the gNB, and a second operation mode for the UEs served by the gNB. When a UE receives the RRC parameter, the UE can determine the gNB's operation mode, and the UE's own operation mode, based on the two components in the indication respectively.

In yet another example for this embodiment, if there is an indication of operation mode as UE-specific in RRC parameter or UE-group-specific as described in the present disclosure, the indication includes the operation mode for the UE. When a UE receives the RRC parameter, the UE can determine the UE's own operation mode.

In yet another example for this embodiment, if there is an indication of operation mode as UE-specific in RRC parameter or UE-group-specific as described in the present disclosure, the indication includes the operation mode for the gNB. When a UE receives the RRC parameter, the UE can determine the gNB's operation mode.

In a third embodiment, the operation mode can be common for a gNB and a served UE or a group of served UEs. A gNB can have multiple operation modes, wherein each of the operation mode is shared with a served UE or a group of served UEs to use the same operation mode. The gNB and served UE or group of served UEs utilize the corresponding operation mode for initializing a transmission.

In one example for this embodiment, if there is an indication of operation mode in system information (e.g., MIB or SIB1) as described in the disclosure, the indicated operation mode is common for both gNB and the gNB's serving UEs. When a UE receives the system information (e.g., SIB1), the UE determines the gNB's operation mode, and the UE's own operation mode, and the two operation modes are the same.

In another example for this embodiment, if there is an indication of operation mode in system information (e.g., MIB or SIB1) as described in the disclosure, the indication has multiple components wherein each of the component correspond to a group of UEs (e.g., UEs in a beam). When a UE receives the system information, the UE determines a component to be applicable first (e.g., which beam is applicable to the UE), and then determines the gNB's operation mode, and the UE's own operation mode, and the two operation modes are the same. In one further example, the multiple components can be expressed as a bitmap, wherein each bit in the bitmap corresponds to the operation mode for a group of UEs. For instance, each of the components can correspond to a SS/PBCH block beam, and the UE can determine the applicable component according to the SS/PBCH block beam that the UE uses for initial cell search or latest cell search.

In yet another example for this embodiment, if there is an indication of operation mode as cell-specific in RRC parameter as described in the present disclosure, the indicated operation mode is common for both a gNB and the gNB's serving UEs. When a UE received the cell-specific RRC parameter, the UE determines the gNB's operation mode and the UE's own operation mode, and the two operation modes are the same.

In yet another example for this embodiment, if there is an indication of operation mode as cell-specific in RRC parameter as described in the present disclosure, the indication has multiple components wherein each of the component correspond to a group of UEs (e.g., UEs in a beam). When a UE received the cell-specific RRC parameter, the UE determines a component to be applicable first (e.g., which beam is applicable to the UE), and then determines the gNB's operation mode, and the UE's own operation mode, and the two operation modes are the same. In one further example, the multiple components can be expressed as a bitmap, wherein each bit in the bitmap corresponds to the operation mode for a group of UEs. For instance, each of the components can correspond to a SS/PBCH block beam, and the UE can determine the applicable component according to the SS/PBCH block beam that the UE has QCL assumption with.

In yet another example for this embodiment, if there is an indication of operation mode as UE-specific or UE-group-specific in RRC parameter as described in the present disclosure, the indicated operation mode is common for both a gNB and the gNB's serving UEs. When a UE received the cell-specific RRC parameter, the UE determines the gNB's operation mode and the UE's own operation mode, and the two operation modes are the same.

In yet another example for this embodiment, if there is an indication of operation mode as UE-specific or UE-group-specific in RRC parameter as described in the present disclosure, the indication has multiple components wherein each of the component correspond to a group of UEs. When a UE received the RRC parameter, the UE determines a component to be applicable first, and then determines the gNB's operation mode, and the UE's own operation mode, and the two operation modes are the same. In one further example, the multiple components can be expressed as a bitmap, wherein each bit in the bitmap corresponds to the operation mode for a group of UEs. For instance, each of the components can correspond to a SS/PBCH block beam, and the UE can determine the applicable component according to the SS/PBCH block beam that the UE has QCL assumption with. For another instance, each of the components can correspond to a TCI state, and the UE can determine the applicable component according to which TCI state the UE has QCL assumption with.

In one instance of the example of this embodiment, when there are multiple components included in the example, wherein each component corresponds to a beam, the number of components (e.g., the number of beams) can be determined as at least one of the following examples: in a first example, the number of components equals to the number of SS/PBCH block beams, and each component corresponds to one SS/PBCH block beams; in a second example, the number of components equals to the number of transmitted SS/PBCH blocks, and each component corresponds to a transmitted SS/PBCH block beam; in a third example, the number of components equals to the number of configured TCI state, and each component corresponds to a configured TCI state; in a third example, the number of components equals to the number of configured active TCI state, and each component corresponds to a configured active TCI state.

In one embodiment, if a UE receives an indication of operation mode (e.g., gNB's and/or UE's operation mode) from system information, and also receives an indication of operation mode from a RRC parameter, the indication from RRC parameter overrides the indication from system information. For example, the indication from a UE-specific RRC parameter overrides the indication from system information.

In another embodiment, if a UE receives an indication of operation mode (e.g., gNB's and/or UE's operation mode) from system information, and also receives an indication of operation mode from a DCI format, the indication from the DCI format overrides the indication from system information.

In yet another embodiment, if a UE receives an indication of operation mode (e.g., gNB's and/or UE's operation mode) from a RRC parameter, and also receives an indication of operation mode from a DCI format, the indication from the DCI format overrides the indication from the RRC parameter.

In one embodiment, if a UE receives an indication of operation mode (e.g., gNB's and/or UE's operation mode) from a cell-specific indication, and also receives an indication of operation mode from a UE-specific indication, the indication from UE-specific indication overrides the indication from cell-specific indication.

In one embodiment, an explicit indication of components in an operation mode is provided.

In one example, a UE is configured by a gNB explicitly with the components in an operation mode.

In one example, a UE is configured by a gNB explicitly with the components in an operation mode using system information (e.g., MIB or SIB1). In one instance for this example, one field of the operation mode in system information (e.g., MIB or SIB1) contains example components as described in the present disclosure.

Figures 9, 10:
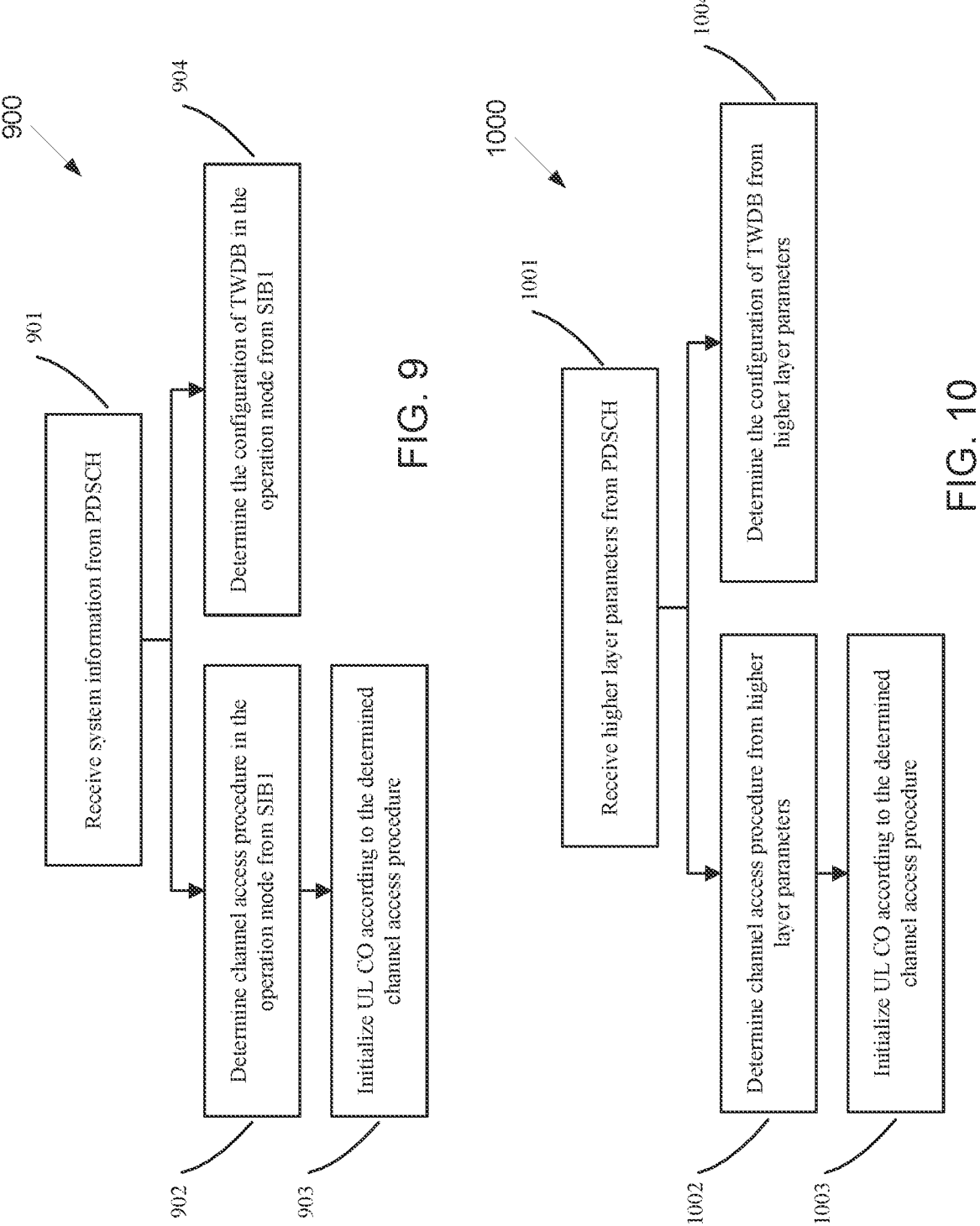
FIG. 9 illustrates yet another a flowchart of a method for an operation mode of UE according to embodiments of the present disclosure.
FIG. 10 illustrates yet another a flowchart of a method for an operation mode of UE according to embodiments of the present disclosure.

FIG. 9 illustrates yet another a flowchart of a method 900 for an operation mode of UE according to embodiments of the present disclosure. The method 900 as may be performed by a UE (e.g., 111-116 as illustrated in FIG. 1. An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

As illustrated in FIG. 9, a UE first receives the system information (e.g., MIB or SIB1) from PDSCH (step 901), and further determines, from the system information (e.g., MIB or SIB1), the channel access procedure (step 902), and the configuration of a TWDB if the TWDB is provided (step 904). The UE can initialize an uplink channel occupancy according to the determined channel access procedure (step 903).

In another example, the UE is configured by the gNB explicitly with the components in an operation mode using higher layer parameters (e.g., RRC parameters). In one instance for this example, one field of the operation mode in the higher layer parameter contains example components as described in the present disclosure.

FIG. 10 illustrates yet another a flowchart of a method 1000 for an operation mode of UE according to embodiments of the present disclosure. The method 1000 as may be performed by a UE (e.g., 111-116 as illustrated in FIG. 1. An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

As illustrated in FIG. 10, a UE first receives the higher layer parameters from PDSCH (step 1001), and further determines, from the higher layer parameters, the channel access procedure (step 1002), and the configuration of a transmission window for TWDB if the TWDB is provided (step 1004). The UE can initialize an uplink channel occupancy according to the determined channel access procedure (step 1003).

In one embodiment, an implicit indication of an operation mode is provided.

In yet another example, the UE acquires at least one component in an operation mode and determines the operation mode based on the at least one component and determines the rest component(s) of the operation mode.

Figure 11:
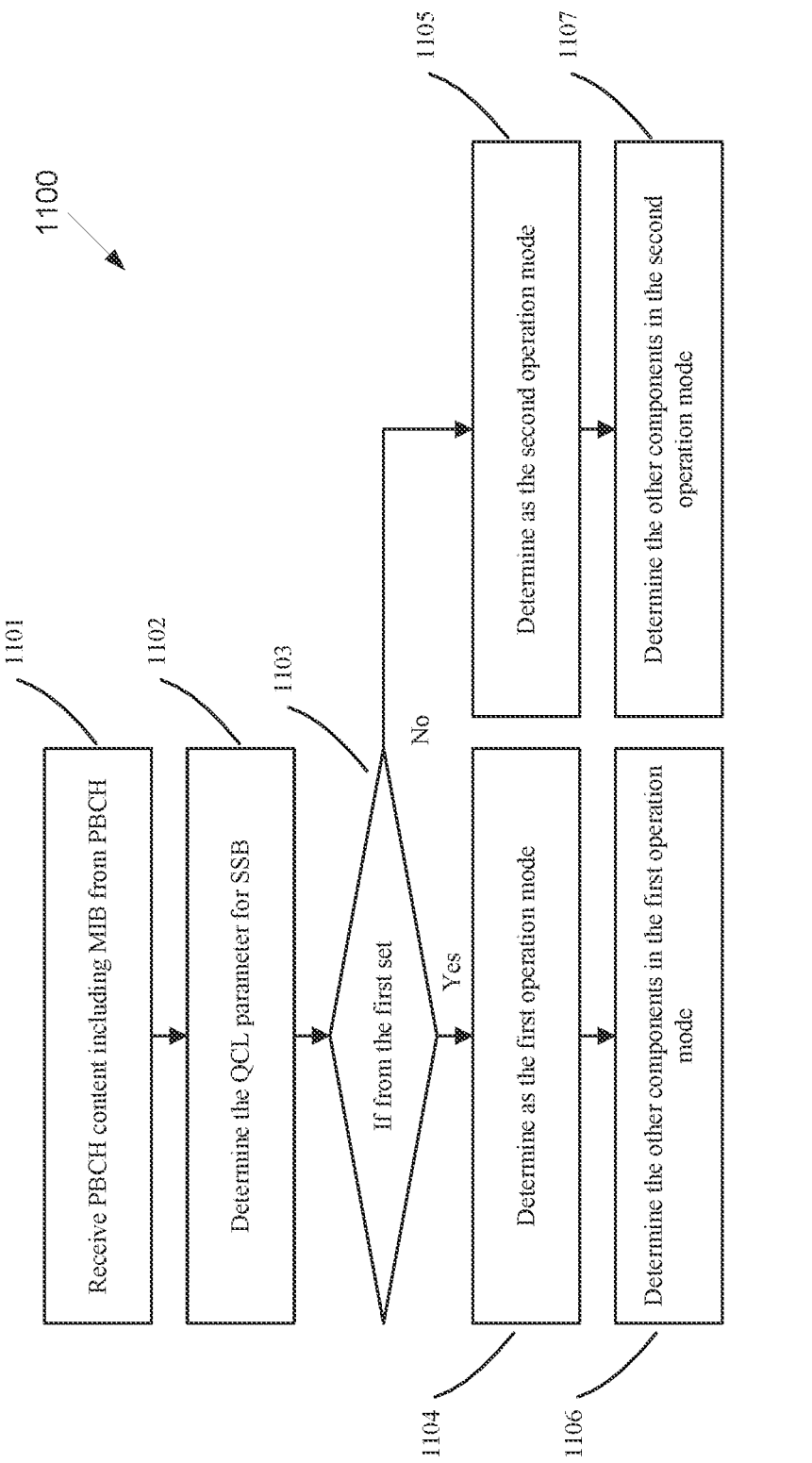
FIG. 11 illustrates yet another a flowchart of a method for an operation mode of UE according to embodiments of the present disclosure.

FIG. 11 illustrates yet another a flowchart of a method 1100 for an operation mode of UE according to embodiments of the present disclosure. The method 1100 as may be performed by a UE (e.g., 111-116 as illustrated in FIG. 1. An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

In one example, a UE determines the operation mode based on the value of the QCL parameter for SS/PBCH block $$\left(\text{i.e., } N_{SSB}^{QCL}\right)$$

provided to the UE, as included in the PBCH content (e.g., MIB).

As illustrated in FIG. 11, a UE first receives PBCH content including MIB from PBCH (step 1101), and further determines, from the PBCH content (e.g., MIB), the QCL parameter for SS/PBCH block $$\left(\text{i.e., } N_{SSB}^{QCL}\right)$$

(step 1102). If the QCL parameter corresponds to a first set (e.g., numerical values, such as {1, 2, 4, 8, 16, 32, 64} if the total number bits i1 3, or its subset {16, 32, 64} if the total number of bits is 2) (step 1103), the UE determines a first operation mode (step 1104); if the QCL parameter corresponds to a second set (e.g., non-numerical value, such as "not applicable"), the UE determines a second operation mode (step 1105). The UE can further determine the other components in the operation mode, such as channel access procedure, and/or configuration of transmission window for a TWDB, based on the determined operation mode (step 1106 and step 1107).

For instance, if the UE determines the first operation mode, the corresponding channel access procedure is associated with a channel sensing procedure; if the UE determines the second operation mode, the corresponding channel access procedure is not associated with a channel sensing procedure. For another instance, if the UE determines the first operation mode, the UE can assume TWDB is enabled and there exists a configuration of TWDB in SIB1; if the UE determines the second operation mode, the UE can assume TWDB is not enabled, and there is no configuration of TWDB in SIB1, or the UE can ignore the configuration of TWDB in SIB1.

Figure 12:
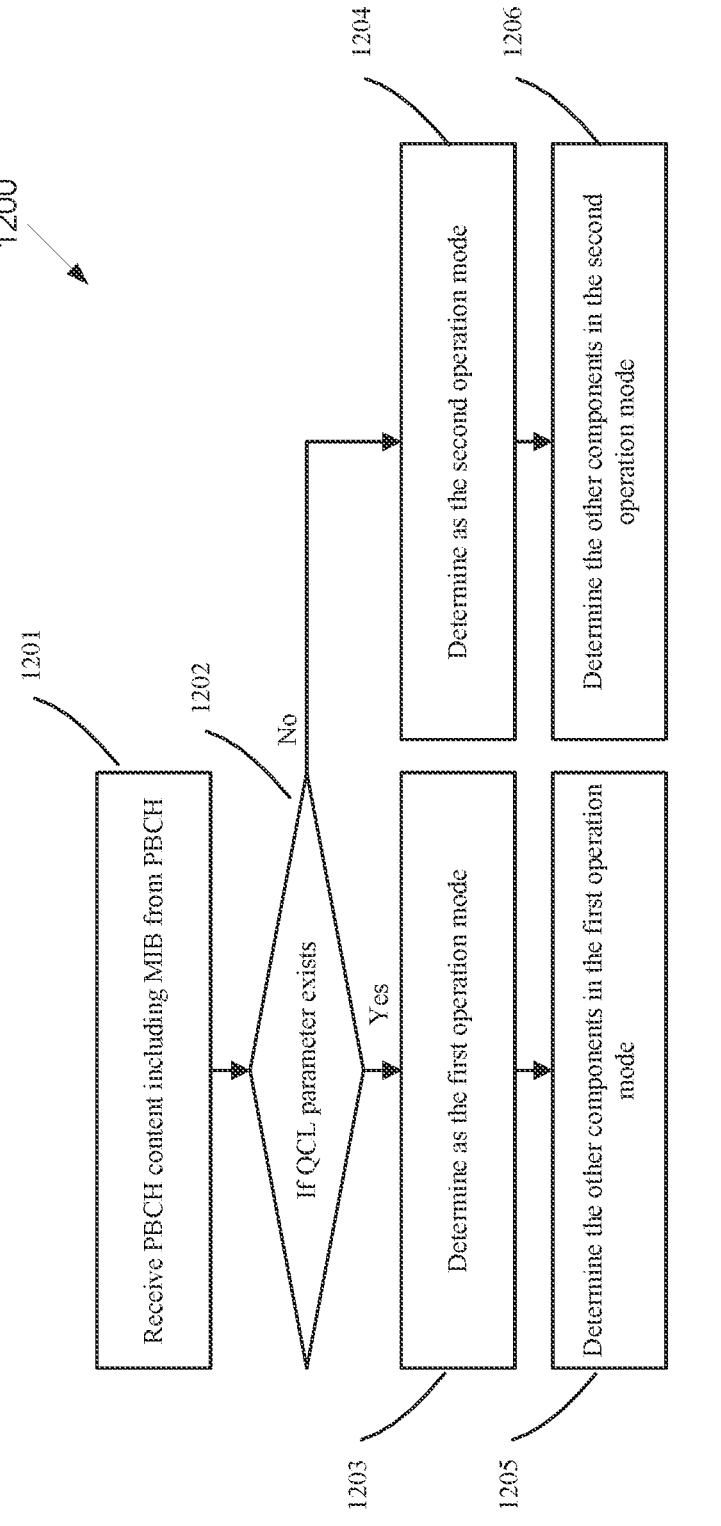
FIG. 12 illustrates yet another a flowchart of a method for an operation mode of UE according to embodiments of the present disclosure.

FIG. 12 illustrates yet another a flowchart of a method 1200 for an operation mode of UE according to embodiments of the present disclosure. The method 1200 as may be performed by a UE (e.g., 111-116 as illustrated in FIG. 1. An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

In one example, a UE determines the operation mode by the existence of the QCL parameter for SS/PBCH block $$\text{(i.e., } N_{SSB}^{QCL}\text{)}$$

provided to the UE, as included in the PBCH content (e.g., MIB).

As illustrated in FIG. 12, a UE first receives PBCH content including MIB from PBCH (step 1201), and further determines, from the PBCH content (e.g., MIB), whether the QCL parameter for SS/PBCH block $$\text{(i.e., } N_{SSB}^{QCL}\text{)}$$

exists (step 1202). If the QCL parameter exists, the UE determines a first operation mode (step 1203); if the QCL parameter does not exist, the UE determines a second operation mode (step 1204). The UE can further determine the other components in the operation mode, such as channel access procedure, and/or configuration of transmission window for a TWDB, based on the determined operation mode (step 1205 and step 1206).

For instance, if the UE determines the first operation mode, the corresponding channel access procedure is associated with a channel sensing procedure; if the UE determines the second operation mode, the corresponding channel access procedure is not associated with a channel sensing procedure. For another instance, if the UE determines the first operation mode, there exists a configuration of TWDB in SIB1; if the UE determines the second operation mode, the UE can assume there is no configuration of TWDB in SIB1, or the UE can ignore the configuration of TWDB in SIB1.

Figure 13:
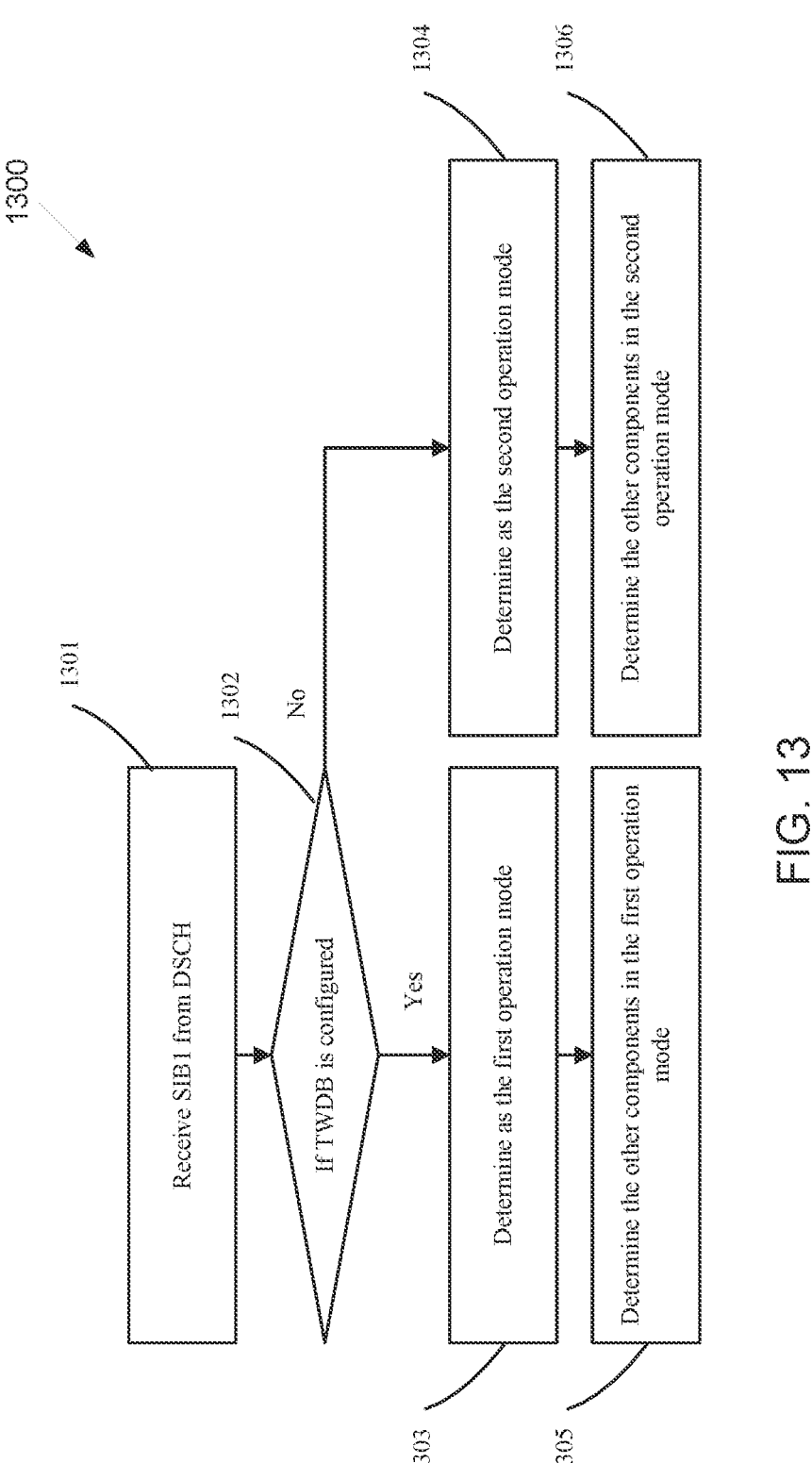
FIG. 13 illustrates yet another a flowchart of a method for an operation mode of UE according to embodiments of the present disclosure.

FIG. 13 illustrates yet another a flowchart of a method 1300 for an operation mode of UE according to embodiments of the present disclosure. The method 1300 as may be performed by a UE (e.g., 111-116 as illustrated in FIG. 1. An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

For yet another example, a UE determines the operation mode by the existence of the configuration of transmission window for discovery burst, as provided by SIB1.

As illustrated in FIG. 13, a UE first receives SIB1 from PDSCH (step 1301), and further determines, from the SIB1, whether a transmission window for discovery burst is configured or not (step 1302). If the transmission window for discovery burst is provided to the UE, the UE determines a first operation mode (step 1303); if the transmission window for discovery burst is not provided to the UE, the UE determines a second operation mode (step 1404). The UE can further determine the other components in the operation mode, such as channel access procedure, based on the determined operation mode (step 1305 and step 1306).

For instance, if the UE determines the first operation mode, the corresponding channel access procedure is associated with a channel sensing procedure; if the UE determines the second operation mode, the corresponding channel access procedure is not associated with a channel sensing procedure.

Figure 14:
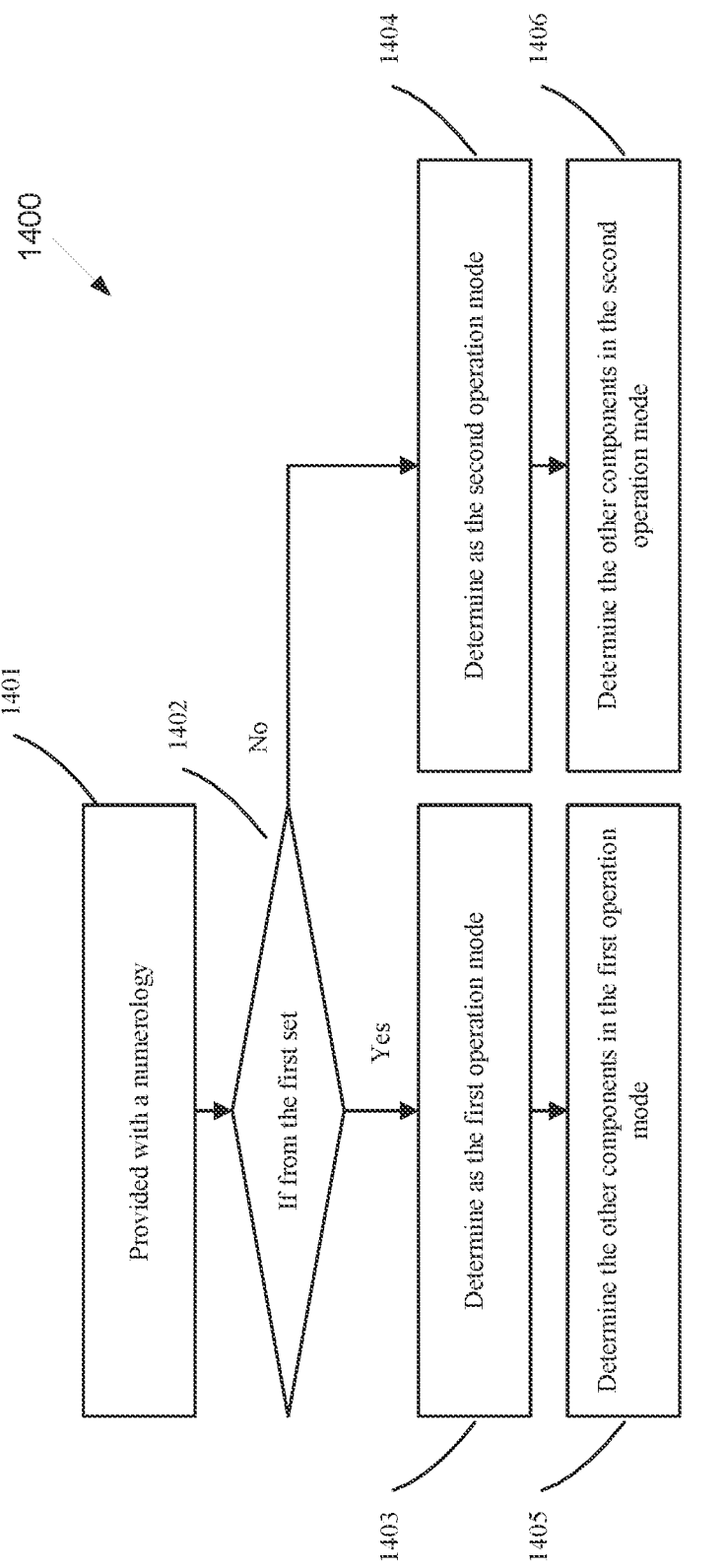
FIG. 14 illustrates yet another a flowchart of a method for an operation mode of UE according to embodiments of the present disclosure.

FIG. 14 illustrates yet another a flowchart of a method 1400 for an operation mode of UE according to embodiments of the present disclosure. The method 1400 as may be performed by a UE (e.g., 111-116 as illustrated in FIG. 1. An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

For yet another example, a UE determines the operation mode by the numerology provided to the UE. For instance, the numerology can be the numerology of SS/PBCH block configured to the UE.

As illustrated in FIG. 14, a UE is provided with a numerology (step 1401), and further determines whether the provided numerology belongs to a first set of values (step 1402). If the UE is provided with a numerology in a first set of values, the UE determines a first operation mode (step 1403); if the UE is provided with a numerology in a second set of value, the UE determines a second operation mode (step 1404). The UE can further determine the other components in the operation mode, such as channel access procedure, and/or configuration of transmission window for a TWDB, based on the determined operation mode (step 1405 and step 1406).

For instance, if the UE determines the first operation mode, the corresponding channel access procedure is associated with a channel sensing procedure; if the UE determines the second operation mode, the corresponding channel access procedure is not associated with a channel sensing procedure. For another instance, if the UE determines the first operation mode, there exists a configuration of TWDB; if the UE determines the second operation mode, the UE can assume there is no configuration of TWDB, or the UE can ignore the configuration of TWDB.

Figure 15:
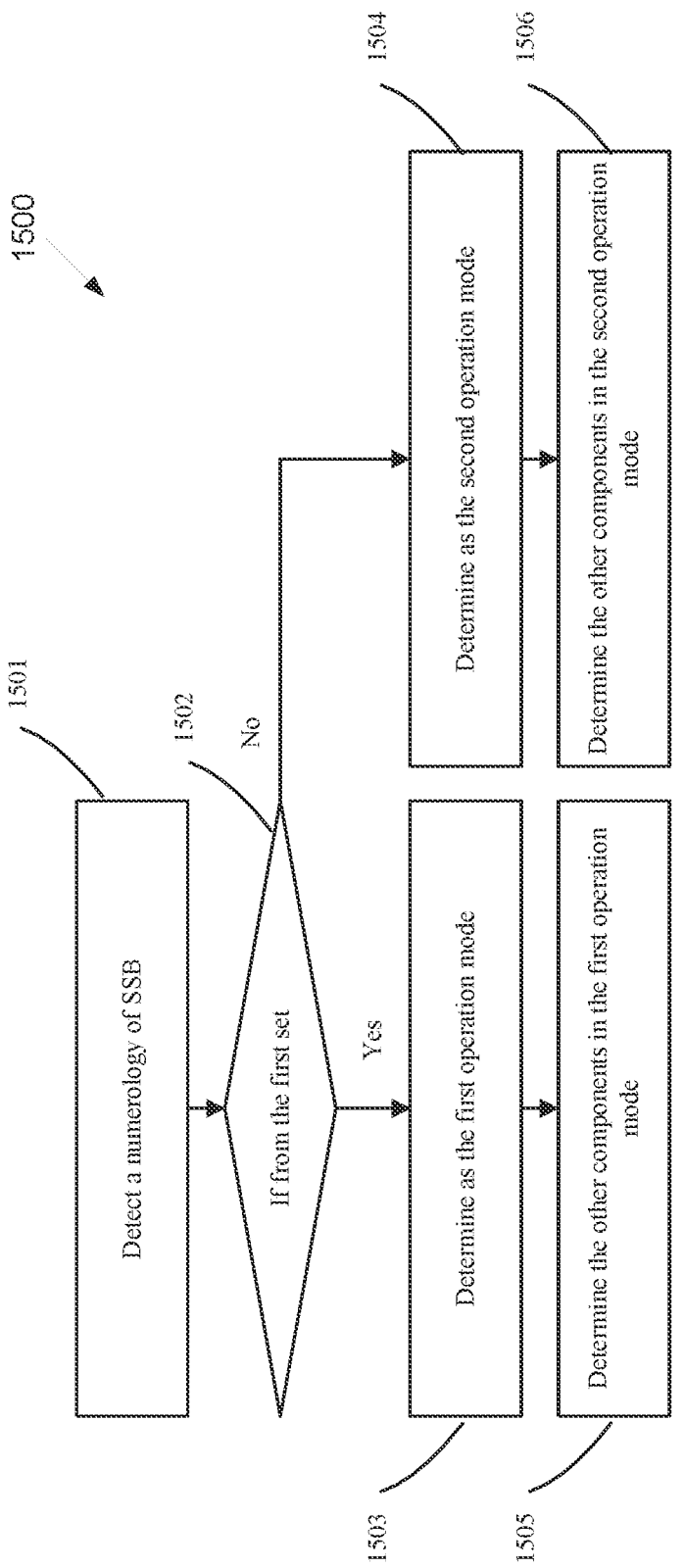
FIG. 15 illustrates yet another a flowchart of a method for an operation mode of UE according to embodiments of the present disclosure.

FIG. 15 illustrates yet another a flowchart of a method 1500 for an operation mode of UE according to embodiments of the present disclosure. The method 1500 as may be performed by a UE (e.g., 111-116 as illustrated in FIG. 1. An embodiment of the method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

For yet another example, a UE determines the operation mode by the numerology of SS/PBCH block detected by the UE, such as in the cell search procedure.

As illustrated in FIG. 15, a UE first detects a numerology of SS/PBCH block (step 1501), and further determines whether the detected numerology belongs to a first set of values (step 1502). If the detected numerology is in a first set of values, the UE determines a first operation mode (step 1503); if the detected numerology is in a second set of values, the UE determines a second operation mode (step 1504). The UE can further determine the other components in the operation mode, such as channel access procedure, and/or configuration of transmission window for a TWDB, based on the determined operation mode (step 1505 and step 1506).

For instance, if the UE determines the first operation mode, the corresponding channel access procedure is associated with a channel sensing procedure; if the UE determines the second operation mode, the corresponding channel access procedure is not associated with a channel sensing procedure. For another instance, if the UE determines the first operation mode, there exists a configuration of TWDB; if the UE determines the second operation mode, the UE can assume there is no configuration of TWDB, or the UE can ignore the configuration of TWDB.

Figure 16:
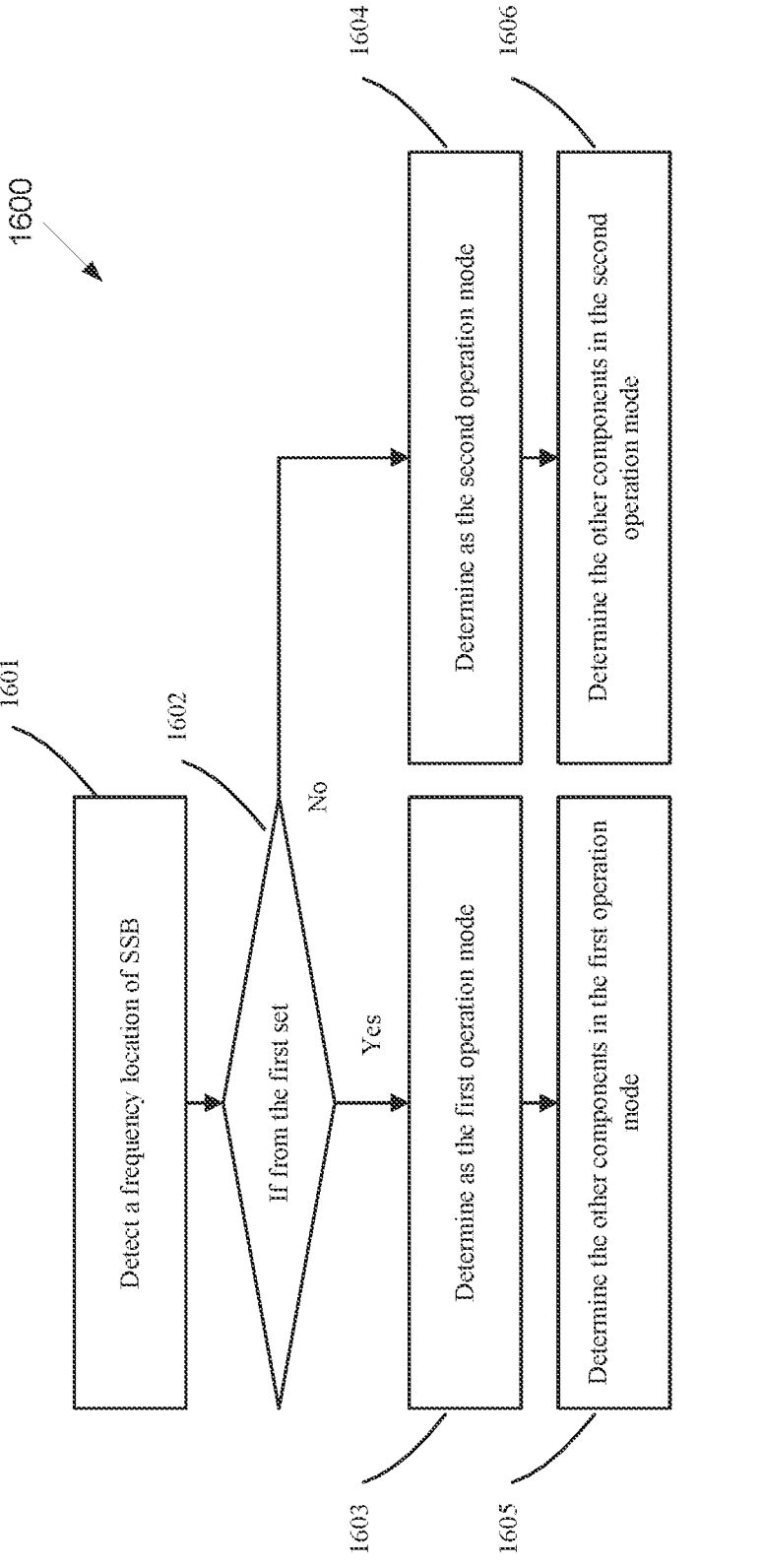
FIG. 16 illustrates yet another a flowchart of a method for an operation mode of UE according to embodiments of the present disclosure.

FIG. 16 illustrates yet another a flowchart of a method 1600 for an operation mode of UE according to embodiments of the present disclosure. The method 1600 as may be performed by a UE (e.g., 111-116 as illustrated in FIG. 1. An embodiment of the method 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions.

For yet another example, a UE determines the operation mode by the frequency location of SS/PBCH block detected by the UE, such as the sync raster of the SS/PBCH block in the initial access procedure. In one instance, the sync raster values (e.g., GSCN values) for the first and second operation modes do not overlap.

As illustrated in FIG. 16, a UE first detects a frequency location of SS/PBCH block (step 1601), e.g., a sync raster, and further determines whether the detected frequency location belongs to a first set of values (step 1602). If the detected numerology is in a first set of values, the UE determines a first operation mode (step 1603); if the detected numerology is in a second set of values, the UE determines a second operation mode (step 1604). The UE can further determine the other components in the operation mode, such as channel access procedure, and/or configuration of transmission window for a TWDB, based on the determined operation mode (step 1605 and step 1606).

For instance, if the UE determines the first operation mode, the corresponding channel access procedure is associated with a channel sensing procedure; if the UE determines the second operation mode, the corresponding channel access procedure is not associated with a channel sensing procedure. For another instance, if the UE determines the first operation mode, there exists a configuration of TWDB; if the UE determines the second operation mode, the UE can assume there is no configuration of TWDB, or the UE can ignore the configuration of TWDB.

Figure 17:
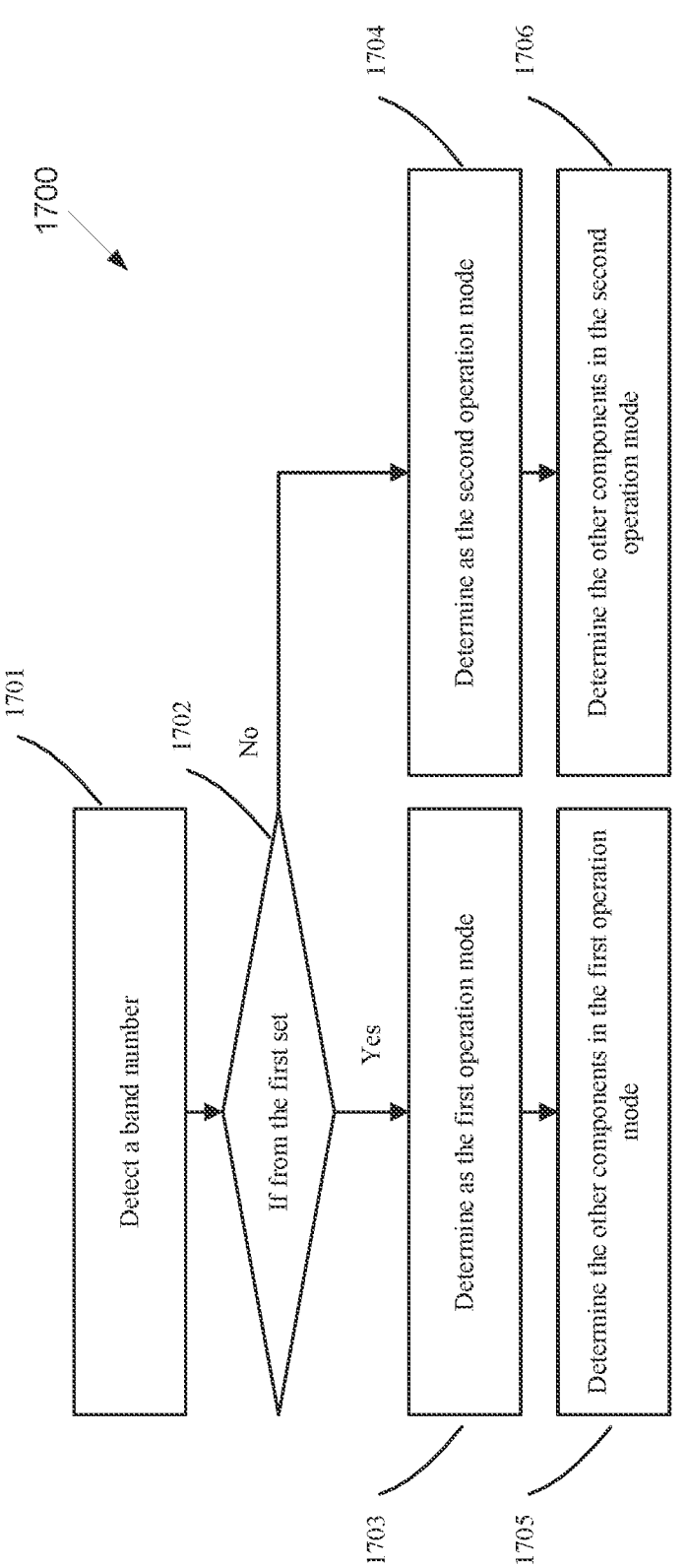
FIG. 17 illustrates yet another a flowchart of a method for an operation mode of UE according to embodiments of the present disclosure.

FIG. 17 illustrates yet another a flowchart of a method 1700 for an operation mode of UE according to embodiments of the present disclosure. The method 1700 as may be performed by a UE (e.g., 111-116 as illustrated in FIG. 1. An embodiment of the method 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions.

For yet another example, a UE determines the operation mode by the band number. In one instance, the band numbers for the first and second operation modes do not overlap.

As illustrated in FIG. 17, a UE first detects the band number (step 1701), and further determines whether the detected frequency location belongs to a first set of values (step 1702). If the detected numerology is in a first set of values, the UE determines a first operation mode (step 1703); if the detected numerology is in a second set of values, the UE determines a second operation mode (step 1704). The UE can further determine the other components in the operation mode, such as channel access procedure, and/or configuration of transmission window for a TWDB, based on the determined operation mode (step 1705 and step 1706).

For instance, if the UE determines the first operation mode, the corresponding channel access procedure is associated with a channel sensing procedure; if the UE determines the second operation mode, the corresponding channel access procedure is not associated with a channel sensing procedure. For another instance, if the UE determines the first operation mode, there exists a configuration of TWDB; if the UE determines the second operation mode, the UE can assume there is no configuration of TWDB, or the UE can ignore the configuration of TWDB.

For illustrative purposes the steps of this algorithm are described serially, however, some of these steps may be performed in parallel to each other. The above operation diagrams illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station (BS) in a wireless communication system including a channel operating with shared spectrum channel access, the BS comprising:

a processor configured to:

determine an operation mode for the BS and a user equipment (UE) served by the BS;

determine, based on information for the operation mode, whether a channel sensing is required in a channel access procedure before a transmission on the channel operating with shared spectrum channel access; and determine, when the channel sensing is required, a configuration of a transmission window for a discovery burst and a quasi-co-location (QCL) parameter for synchronization signals and physical broadcast channel (SS/PBCH) blocks; and a transceiver operably coupled to the processor, the transceiver configured to:

perform the channel sensing in the channel access procedure before a transmission to the UE when the operation mode includes information that the channel sensing is required;

transmit to the UE over the channel after sensing the channel to be idle; and transmit, to the UE via higher layer parameters, information indicating the operation mode, the configuration of the transmission window for the discovery burst, and the QCL parameter for the SS/PBCH blocks, wherein the higher layer parameters are included in at least one of a master information block (MIB), a system information block 1 (SIB1), and a dedicated radio resource control (RRC) parameter, and wherein, when the higher layer parameters are included in both of the SIB1 and the dedicated RRC parameter, a value of the operation mode in the dedicated RRC parameter overrides a value of the operation mode in the SIB1.

2. The BS of claim 1, wherein:

the operation mode is indicated as a bitmap, each bit in the bitmap corresponds to a beam, and a bitwidth in the bitmap corresponds to a number of beams.

3. The BS of claim 2, wherein the beam is associated with a transmission configuration indicator (TCI) state configured by the BS.

4. The BS of claim 1, wherein for UEs using a same beam, the information on whether the channel sensing is required before the transmission on the channel operating with shared spectrum channel access included in the operation mode is the same.

5. A user equipment (UE) in a wireless communication system including a channel operating with shared spectrum channel access, the UE comprising:

a transceiver configured to receive, from a base station (BS), higher layer parameters, the higher layer parameters including information indicating a quasi-co-location (QCL) parameter for synchronization signals and physical broadcast channel (SS/PBCH) blocks; and a processor operably coupled to the transceiver, the processor configured to:

determine, from the higher layer parameters, an operation mode for the BS and the UE, determine, based on information for the operation mode, whether a channel sensing is required in a channel access procedure before a transmission on the channel operating with shared spectrum channel access, and determine, when the channel sensing is required, a configuration of a transmission window for a discovery burst based on the higher layer parameters and the QCL parameter for the SS/PBCH blocks, and wherein the transceiver is further configured to:

perform the channel sensing in the channel access procedure before a transmission to the BS when the operation mode includes information that the channel sensing is required; and transmit to the BS over the channel after sensing the channel to be idle, wherein the higher layer parameters are included in at least one of a master information block (MIB), a system information block 1 (SIB1), and a dedicated radio resource control (RRC) parameter, and wherein, when the higher layer parameters are included in both of the SIB1 and the dedicated RRC parameter, a value of the operation mode in the dedicated RRC parameter overrides a value of the operation mode in the SIB1.

6. The UE of claim 5, wherein:

the operation mode is determined from a bitmap, each bit in the bitmap corresponds to a beam, and a bitwidth in the bitmap corresponds to a number of beams.

7. The UE of claim 6, wherein the beam is associated with a transmission configuration indicator (TCI) state configured by the BS.

8. The UE of claim 5, wherein for UEs using a same beam, the information on whether the channel sensing is required before the transmission on the channel operating with shared spectrum channel access included in the operation mode is the same.

9. A method of operating a user equipment (UE) in a wireless communication system including a channel operating with shared spectrum channel access, the method comprising:

receiving, from a base station (BS), higher layer parameters, the higher layer parameters including information indicating a quasi-co-location (QCL) parameter for synchronization signals and physical broadcast channel (SS/PBCH) blocks;

determining, from the higher layer parameters, an operation mode for the BS and the UE;

determining, based on information for the operation mode, whether a channel sensing is required in a channel access procedure before a transmission on the channel operating with shared spectrum channel access;

determining, when the channel sensing is required, a configuration of a transmission window for a discovery burst based on the higher layer parameters and the QCL parameter for the SS/PBCH blocks;

performing a channel sensing in a channel access procedure before a transmission to the BS based on the operation mode including information that the channel sensing is required; and transmitting to the BS over the channel after sensing the channel to be idle, wherein the higher layer parameters are included in at least one of a master information block (MIB), a system information block 1 (SIB1), and a dedicated radio resource control (RRC) parameter, and wherein, when the higher layer parameters are included in both of the SIB1 and the dedicated RRC parameter, a value of the operation mode in the dedicated RRC parameter overrides a value of the operation mode in the SIB1.

10. The method of claim 9, wherein:

the operation mode is determined from a bitmap, each bit in the bitmap corresponds to a beam, and a bitwidth in the bitmap corresponds to a number of beams.

11. The method of claim 10, wherein the beam is associated with a transmission configuration indicator (TCI) state configured by the BS.

12. The method of claim 9, wherein for UEs using a same beam, the information on whether the channel sensing is required before the transmission on the channel operating with shared spectrum channel access included in the operation mode is the same.

* * * * *